United States Patent
Pedersen

(10) Patent No.: US 11,840,176 B2
(45) Date of Patent: *Dec. 12, 2023

(54) MOTOR VEHICLE ARTIFICIAL INTELLIGENCE EXPERT SYSTEM DANGEROUS DRIVING WARNING AND CONTROL SYSTEM AND METHOD

(71) Applicant: Robert D. Pedersen, Dallas, TX (US)

(72) Inventor: Robert D. Pedersen, Dallas, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 17/862,348

(22) Filed: Jul. 11, 2022

(65) Prior Publication Data

US 2022/0355733 A1 Nov. 10, 2022

Related U.S. Application Data

(63) Continuation of application No. 17/524,616, filed on Nov. 11, 2021, now Pat. No. 11,427,125, which is a (Continued)

(51) Int. Cl.
*B60Q 9/00* (2006.01)
*G10L 25/78* (2013.01)
(Continued)

(52) U.S. Cl.
CPC .............. *B60Q 9/008* (2013.01); *G06N 5/02* (2013.01); *G06N 5/048* (2013.01); *G06V 20/56* (2022.01);
(Continued)

(58) Field of Classification Search
CPC .......... B60Q 9/008; H04W 4/90; H04W 4/80; H04W 4/40; H04W 4/023;
(Continued)

(56) References Cited

U.S. PATENT DOCUMENTS 3,662,401 A 5/1972 Collins et al.
4,852,001 A 7/1989 Tsushima et al.
(Continued)

OTHER PUBLICATIONS

3GPP TS 23.246 V12.3.0 (Sep. 2014) Technical Specification, 3rd Generation Partnership Project; Technical Specification Group Services and System Aspects; Multimedia Broadcast/Multicast Service (MBMS); Architecture and functional description (Release 12) 67 pages; 3GPP Organizational Partners' Publications; no month, 2015; Valbonne, France.

(Continued)

*Primary Examiner* — Kerri L McNally
*Assistant Examiner* — Thang D Tran
(74) *Attorney, Agent, or Firm* — Steven R. Pedersen

(57) ABSTRACT

Specifically programmed, integrated motor vehicle dangerous driving warning and control system and methods comprising at least one specialized communication computer machine including electronic artificial intelligence expert system decision making capability further comprising one or more motor vehicle electronic sensors for monitoring the motor vehicle and for monitoring activities of the driver and/or passengers including activities related to the use of cellular telephones and/or other wireless communication devices and further comprising electronic communications transceiver assemblies for communications with external sensor networks for monitoring dangerous driving situations, weather conditions, roadway conditions, pedestrian congestion and motor vehicle traffic congestion conditions to derive warning and/or control signals for warning the driver of dangerous driving situations and/or for controlling the motor vehicle driver use of a cellular telephone and/or other wireless communication devices.

20 Claims, 26 Drawing Sheets

Related U.S. Application Data continuation of application No. 17/334,334, filed on May 28, 2021, now Pat. No. 11,203,294, which is a continuation of application No. 17/024,535, filed on Sep. 17, 2020, now Pat. No. 11,052,821, which is a continuation of application No. 16/563,427, filed on Sep. 6, 2019, now Pat. No. 10,814,784, which is a continuation of application No. 16/168,449, filed on Oct. 23, 2018, now Pat. No. 10,434,943, which is a continuation of application No. 15/885,412, filed on Jan. 31, 2018, now Pat. No. 10,137,834, which is a continuation of application No. 15/277,037, filed on Sep. 27, 2016, now Pat. No. 9,919,648.

(51) Int. Cl.

| | |
|---|---|
| *H04W 4/90* | (2018.01) |
| *G08G 1/048* | (2006.01) |
| *G10L 21/0232* | (2013.01) |
| *H04R 1/40* | (2006.01) |
| *G08G 1/01* | (2006.01) |
| *G10L 15/26* | (2006.01) |
| *G10L 15/22* | (2006.01) |
| *G08G 1/16* | (2006.01) |
| *G06N 5/02* | (2023.01) |
| *H04W 4/80* | (2018.01) |
| *G08G 1/0967* | (2006.01) |
| *G08G 1/00* | (2006.01) |
| *H04R 3/00* | (2006.01) |
| *H04W 4/02* | (2018.01) |
| *H04W 4/40* | (2018.01) |
| *G06N 5/048* | (2023.01) |
| *H04B 5/00* | (2006.01) |
| *H04M 1/72454* | (2021.01) |
| *H04M 1/72463* | (2021.01) |
| *G06V 20/56* | (2022.01) |
| *G06V 20/59* | (2022.01) |
| *G10L 21/0216* | (2013.01) |
| *H04B 7/06* | (2006.01) |

(52) U.S. Cl.
CPC ........... *G06V 20/597* (2022.01); *G08G 1/012* (2013.01); *G08G 1/0116* (2013.01); *G08G 1/0129* (2013.01); *G08G 1/0141* (2013.01); *G08G 1/048* (2013.01); *G08G 1/096716* (2013.01); *G08G 1/096741* (2013.01); *G08G 1/096775* (2013.01); *G08G 1/096783* (2013.01); *G08G 1/166* (2013.01); *G08G 1/167* (2013.01); *G08G 1/205* (2013.01); *G10L 15/22* (2013.01); *G10L 15/26* (2013.01); *G10L 21/0232* (2013.01); *G10L 25/78* (2013.01); *H04B 5/0056* (2013.01); *H04B 5/0081* (2013.01); *H04M 1/72454* (2021.01); *H04M 1/72463* (2021.01); *H04R 1/406* (2013.01); *H04R 3/005* (2013.01); *H04W 4/023* (2013.01); *H04W 4/40* (2018.02); *H04W 4/80* (2018.02); *H04W 4/90* (2018.02); *G10L 2021/02166* (2013.01); *H04B 5/0043* (2013.01); *H04B 7/0617* (2013.01); *H04R 2201/403* (2013.01); *H04R 2499/13* (2013.01)

(58) Field of Classification Search
CPC .......... H04M 1/72463; H04M 1/72454; G06V 20/597; G06V 20/56; G06N 5/02; G06N 5/048; G08G 1/0116; G08G 1/012; G08G 1/0129; G08G 1/0141; G08G 1/048; G08G 1/096716; G08G 1/096741; G08G 1/096775; G08G 1/096783; G08G 1/166; G08G 1/167; G08G 1/205; G10L 15/22; G10L 15/26; G10L 21/0232; G10L 25/78; G10L 2021/02166; H04B 5/0056; H04B 5/0081; H04B 5/0043; H04B 7/0617; H04R 1/406; H04R 3/005; H04R 2201/403; H04R 2499/13

USPC ........................................................ 340/905
See application file for complete search history.

(56) References Cited

U.S. PATENT DOCUMENTS

| | | | |
|---|---|---|---|
| 5,301,320 | A | 4/1994 | McAtee |
| 5,745,687 | A | 4/1998 | Randell |
| 5,768,506 | A | 6/1998 | Randell |
| 5,862,346 | A | 1/1999 | Kley |
| 2,936,571 | A | 8/1999 | Desjardins |
| 5,958,071 | A | 9/1999 | Iida et al. |
| 5,983,131 | A | 11/1999 | Weaver |
| 5,983,161 | A | 11/1999 | Lemelson |
| 6,275,773 | B1 | 8/2001 | Lemelson |
| 6,317,058 | B1 | 11/2001 | Lemelson |
| 6,334,137 | B1 | 12/2001 | Iida et al. |
| 6,487,500 | B2 | 11/2002 | Lemelson |
| 6,636,884 | B2 | 10/2003 | Iida et al. |
| 7,024,669 | B1 | 4/2006 | Leymann et al. |
| 7,408,907 | B2 | 8/2008 | Diener |
| 7,693,486 | B2 | 4/2010 | Kasslin |
| 7,697,917 | B2 | 4/2010 | Camp, Jr. et al. |
| 7,856,360 | B2 | 12/2010 | Kramer et al. |
| 8,060,150 | B2 | 11/2011 | Mendenhall et al. |
| 8,145,199 | B2 | 3/2012 | Tadayon et al. |
| 8,229,458 | B2 | 7/2012 | Busch |
| 8,295,890 | B2 | 10/2012 | Mendenhall et al. |
| 8,364,171 | B2 | 1/2013 | Busch |
| 8,437,776 | B2 | 5/2013 | Busch |
| 8,447,331 | B2 | 5/2013 | Busch |
| 8,515,459 | B2 | 8/2013 | Busch |
| 8,538,402 | B2 | 9/2013 | Vidal et al. |
| 8,566,236 | B2 | 10/2013 | Busch |
| 8,595,824 | B2 | 11/2013 | Albrecht-Buehler |
| 8,626,194 | B2 | 1/2014 | Busch |
| 8,634,816 | B2 | 1/2014 | Xiao et al. |
| 8,635,645 | B2 | 1/2014 | Krishnamoorthi et al. |
| 8,639,263 | B2 | 1/2014 | Salmon |
| 8,750,853 | B2 | 6/2014 | Abramson et al. |
| 8,826,175 | B2 | 9/2014 | Wallis |
| 9,024,783 | B1 | 5/2015 | Alfaro |
| 9,050,930 | B2 | 6/2015 | Walsh |
| 9,086,948 | B1 | 7/2015 | Slusar et al. |
| 9,129,532 | B2 | 9/2015 | Rubin |
| 9,715,711 | B1 | 7/2017 | Konrardy |
| 9,836,062 | B1 | 12/2017 | Hayward |
| 9,919,648 | B1 | 3/2018 | Pedersen |
| 10,137,834 | B2 | 11/2018 | Pedersen |
| 10,268,530 | B2 | 4/2019 | Breaux |
| 10,421,459 | B2 | 9/2019 | Goldman-Shenhar |
| 10,434,943 | B2 | 10/2019 | Pedersen |
| 10,453,337 | B2 | 10/2019 | Anastassov |
| 10,814,784 | B2 | 10/2020 | Pedersen |
| 11,052,821 | B2 | 7/2021 | Pedersen |
| 2002/0022927 | A1 | 2/2002 | Lemelson |
| 2002/0038228 | A1 | 3/2002 | Waldorf |
| 2002/0147642 | A1 | 10/2002 | Avallone et al. |
| 2005/0065711 | A1* | 3/2005 | Dahlgren ......... G08G 1/096775 701/117 |
| 2007/0027583 | A1* | 2/2007 | Tamir ................ H01L 23/49838 701/1 |
| 2007/0073463 | A1 | 3/2007 | Sherony |
| 2007/0152804 | A1 | 7/2007 | Breed |
| 2007/0281716 | A1 | 12/2007 | Altman et al. |
| 2007/0290823 | A1 | 12/2007 | Watanabe |
| 2008/0040004 | A1 | 2/2008 | Breed |
| 2008/0064446 | A1 | 3/2008 | Camp |
| 2008/0084283 | A1* | 4/2008 | Kalik ...................... B60Q 9/00 701/301 |

(56) References Cited

U.S. PATENT DOCUMENTS

| | | |
|---|---|---|
| 2008/0119966 A1* | 5/2008 | Breed .................... G07C 5/085 701/2 |
| 2008/0133336 A1 | 6/2008 | Altman et al. |
| 2008/0172177 A1* | 7/2008 | Sherony .................. G06N 3/02 706/21 |
| 2008/0195261 A1 | 8/2008 | Breed |
| 2008/0291032 A1 | 11/2008 | Prokhorov |
| 2008/0294690 A1 | 11/2008 | McClellan |
| 2009/0040054 A1* | 2/2009 | Wang .................... G06V 20/597 340/576 |
| 2009/0090084 A1 | 4/2009 | Bamberger |
| 2009/0284361 A1* | 11/2009 | Boddie .................. B60Q 9/008 340/439 |
| 2010/0002075 A1 | 1/2010 | Jung |
| 2010/0020169 A1 | 1/2010 | Jang |
| 2010/0207787 A1 | 8/2010 | Catten |
| 2010/0323615 A1 | 12/2010 | Vock et al. |
| 2011/0010094 A1* | 1/2011 | Simon ................... B60W 30/16 701/301 |
| 2011/0169625 A1* | 7/2011 | James ................. B60W 30/095 340/439 |
| 2011/0227713 A1 | 9/2011 | Amann |
| 2012/0057716 A1 | 3/2012 | Chang |
| 2012/0246650 A1 | 9/2012 | Mueller |
| 2012/0303392 A1 | 11/2012 | Depura |
| 2013/0038437 A1* | 2/2013 | Talati .................... G06Q 10/10 340/438 |
| 2013/0226408 A1 | 8/2013 | Fung |
| 2013/0279491 A1 | 10/2013 | Rubin |
| 2013/0288744 A1 | 10/2013 | Vock et al. |
| 2013/0295901 A1 | 11/2013 | Abramson |
| 2013/0335213 A1 | 12/2013 | Sherony |
| 2014/0266655 A1 | 9/2014 | Palan |
| 2014/0309870 A1 | 10/2014 | Ricci |
| 2014/0362347 A1 | 12/2014 | Oel |
| 2015/0015712 A1 | 1/2015 | Sempuku |
| 2015/0077826 A1 | 3/2015 | Beckman |
| 2015/0091740 A1 | 4/2015 | Bai |
| 2015/0092056 A1 | 4/2015 | Rau |
| 2015/0161913 A1 | 6/2015 | Dominguez |
| 2015/0166059 A1 | 6/2015 | Ko |
| 2015/0178578 A1 | 6/2015 | Hampiholi |
| 2015/0191122 A1 | 7/2015 | Roy et al. |
| 2015/0256999 A1* | 9/2015 | Doorandish ............ H04W 4/80 455/419 |
| 2015/0258996 A1 | 9/2015 | Victor |
| 2015/0334269 A1 | 11/2015 | Yokota |
| 2015/0371659 A1 | 12/2015 | Gao |
| 2015/0379362 A1 | 12/2015 | Calmes |
| 2016/0001781 A1 | 1/2016 | Fung |
| 2016/0046298 A1* | 2/2016 | DeRuyck ............. G06V 20/597 340/576 |
| 2016/0101786 A1 | 4/2016 | Johnson |
| 2016/0133130 A1* | 5/2016 | Grimm ................ G08G 1/0129 340/905 |
| 2016/0203717 A1 | 7/2016 | Ginsberg |
| 2016/0223343 A1 | 8/2016 | Averbuch |
| 2016/0267335 A1* | 9/2016 | Hampiholi ............ B60K 28/06 |
| 2016/0297433 A1 | 10/2016 | Cosatto |
| 2016/0307054 A1 | 10/2016 | Takemura |
| 2016/0379485 A1 | 12/2016 | Anastassov |
| 2017/0006151 A1* | 1/2017 | Doorandish ............ H04W 4/90 |
| 2017/0049785 A1 | 2/2017 | Voskuhl |
| 2017/0075740 A1 | 3/2017 | Breaux |
| 2017/0101093 A1 | 4/2017 | Barfield, Jr. |
| 2017/0124407 A1 | 5/2017 | Micks |
| 2017/0186321 A1* | 6/2017 | Dai .................. G08G 1/096725 |
| 2017/0279957 A1 | 9/2017 | Abramson et al. |
| 2017/0323568 A1 | 11/2017 | Inoue |
| 2017/0330455 A1 | 11/2017 | Kikuchi |
| 2017/0341652 A1 | 11/2017 | Sugawara |
| 2018/0005528 A1 | 1/2018 | Loeillet |
| 2018/0009442 A1 | 1/2018 | Spasojevic |
| 2018/0012085 A1 | 1/2018 | Blayvas |
| 2018/0050698 A1* | 2/2018 | Polisson ................ G06Q 10/04 |
| 2018/0086346 A1 | 3/2018 | Fujisawa |
| 2018/0134215 A1 | 5/2018 | Kim |
| 2018/0154892 A1 | 6/2018 | Tamura |
| 2018/0211543 A1 | 7/2018 | Wei |
| 2018/0225963 A1 | 8/2018 | Kobayashi |
| 2018/0229725 A1 | 8/2018 | Akama |

OTHER PUBLICATIONS

AAA; Measuring Cognitive Distraction in the Automobile; Jun. 2013; Washington, DC; US.

Association for Safe International Road Travel; Annual Global Road Crash Statistics; 2016.

Benesty et al., "Microphone Array Signal Processing," Springer, Berlin, Germany and New York, 2008.

Brandstein et al., "Microphone Arrays," Springer, Berlin, Germany and New York, 2001.

Chen, C.H., "Fuzzy Logic and Neural Network Handbook," McGraw-Hill, Inc., no month, 1996; 423 pages; Hightstown, NJ, US.

Cox, Earl; "The Fuzzy Systems Handbook,", Academic Press, Inc.; no month, 1994; 336 pages; Chestnut Hill, MA; US.

Giarrantano et al.; Expert Systems Principles and Programming; Fourth Edition; 433 pages; Course Technology; Thomson Learning, Inc.; 2005; CA.

National Safety Council; Annual Estimate of Cell Phone Crashes 2013; US.

National Safety Council; Understanding the Distracted Brain; Apr. 2012; US.

Varshney, U., "Multicast Over Wireless Networks," Communications of ACM, vol. 45, Issue 12, Dec. 2002; ACM, New York, NY.

* cited by examiner

REPRESENTATIVE ACOUSTIC BEAMFORMING RESPONSE*

* J. Benesty, et. al., "Microphone Array Signal Processing,: Springer, 2008, page 58.

| DRIVER CELLPHONE/ WIRELESS DEVICE SENSOR COMBINATION | NFC SIGNAL | RF SIGNAL | MICROPHONE ARRAY SIGNAL | CAMERA IMAGE SIGNAL | CELLPHONE – WIRELESS DEVICE USAGE SENSOR DECISION |
|---|---|---|---|---|---|
| 1 | O | O | O | O | NO |
| 2 | O | O | O | X | NO |
| 3 | O | O | X | O | NO |
| 4 | O | O | X | X | NO |
| 5 | O | X | O | O | NO |
| 6 | O | X | O | X | NO |
| 7 | O | X | X | O | NO |
| 8 | O | X | X | X | YES |
| 9 | X | O | O | O | NO |
| 10 | X | O | O | X | NO |
| 11 | X | O | X | O | NO |
| 12 | X | O | X | X | YES |
| 13 | X | X | O | O | NO |
| 14 | X | X | O | X | YES |
| 15 | X | X | X | O | YES |
| 16 | X | X | X | X | YES |

FIG. 12

ROAD/WEATHER WARNING INDEX

| ROADS / WEATHER | VERY LOW DANGER | LOW DANGER | MEDIUM DANGER | HIGH DANGER | VERY HIGH DANGER |
|---|---|---|---|---|---|
| VERY LOW DANGER | VERY LOW | VERY LOW | LOW | HIGH | VERY HIGH |
| LOW DANGER | VERY LOW | LOW | MEDIUM | HIGH | HIGH |
| MEDIUM DANGER | LOW | MEDIUM | MEDIUM | HIGH | VERY HIGH |
| HIGH DANGER | MEDIUM | MEDIUM | HIGH | VERY HIGH | VERY HIGH |
| VERY HIGH DANGER | HIGH | HIGH | VERY HIGH | VERY HIGH | VERY HIGH |

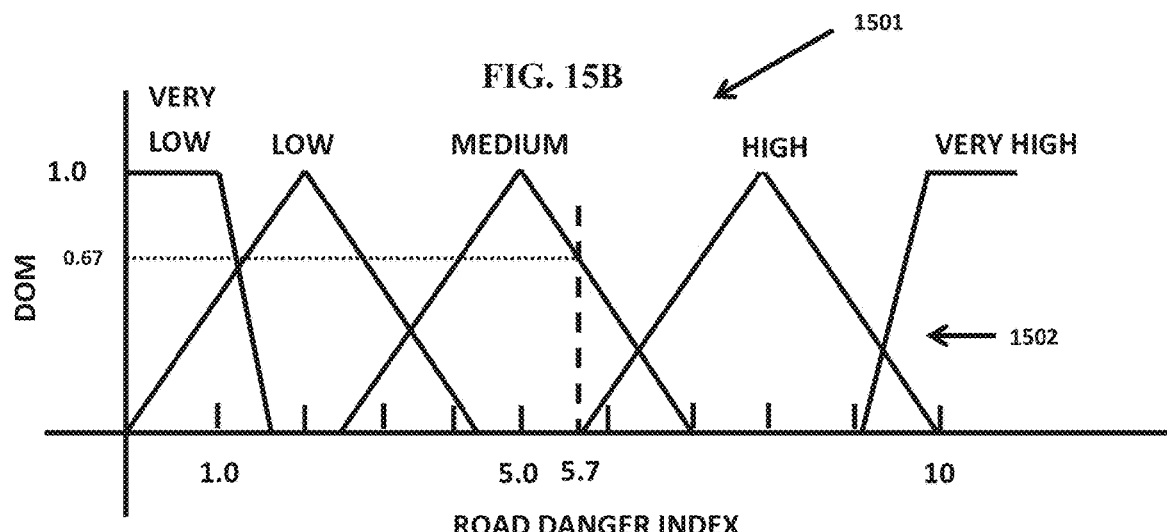
FIG. 15B
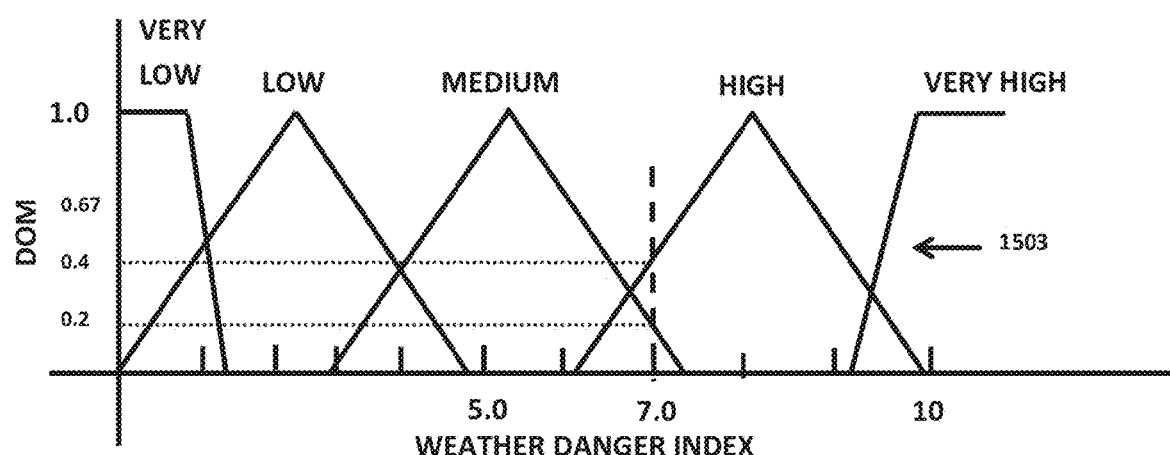
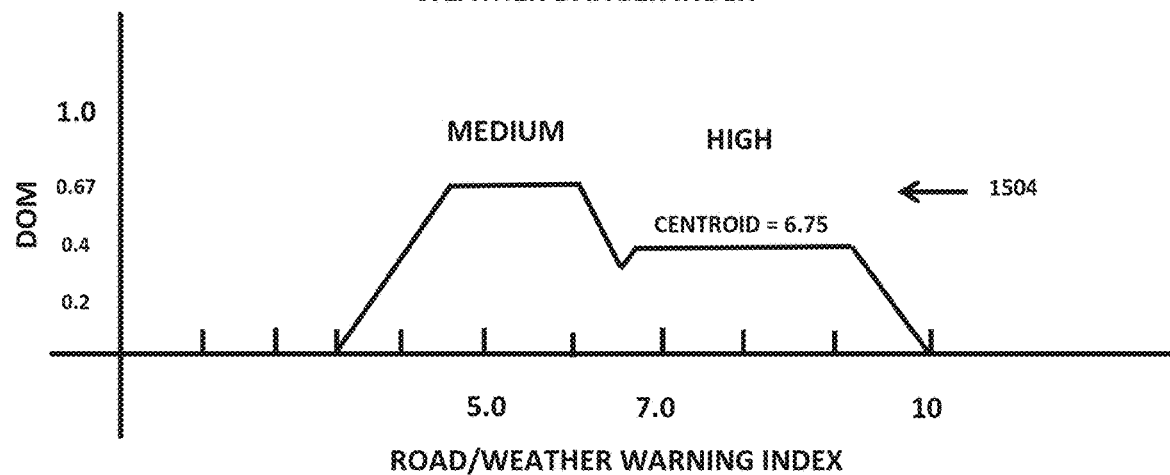

VEHICLE DRIVING WARNING INDEX

| ROAD/WEATHER \ TRAFFIC | VERY LOW DANGER | LOW DANGER | MEDIUM DANGER | HIGH DANGER | VERY HIGH DANGER |
|---|---|---|---|---|---|
| VERY LOW DANGER | VERY LOW | LOW | LOW | MEDIUM | HIGH |
| LOW DANGER | VERY LOW | LOW | MEDIUM | MEDIUM | HIGH |
| MEDIUM DANGER | LOW | MEDIUM | MEDIUM | HIGH | VERY HIGH |
| HIGH DANGER | MEDIUM | MEDIUM | HIGH | VERY HIGH | VERY HIGH |
| VERY HIGH DANGER | MEDIUM | HIGH | VERY HIGH | VERY HIGH | VERY HIGH |

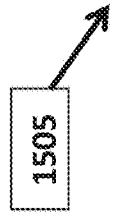
1505

FIG. 15C

DRIVER WARNING INDEX

| DRIVER / VEHICLE DRIVING | VERY LOW DISTRACTION | LOW DISTRACTION | MEDIUM DISTRACTION | HIGH DISTRACTION | VERY HIGH DISTRACTION |
|---|---|---|---|---|---|
| VERY LOW DANGER | VERY LOW | LOW | LOW | MEDIUM | HIGH |
| LOW DANGER | VERY LOW | LOW | MEDIUM | MEDIUM | HIGH |
| MEDIUM DANGER | LOW | MEDIUM | MEDIUM | HIGH | VERY HIGH |
| HIGH DANGER | MEDIUM | MEDIUM | HIGH | HIGH | VERY HIGH |
| VERY HIGH DANGER | MEDIUM | HIGH | HIGH | HIGH | VERY HIGH |

MOTOR VEHICLE ARTIFICIAL INTELLIGENCE EXPERT SYSTEM DANGEROUS DRIVING WARNING AND CONTROL SYSTEM AND METHOD

CROSS-REFERENCE TO RELATED APPLICATIONS

This application is a continuation of U.S. Ser. No. 17/524,616 filed on Nov. 11, 2021, which is a continuation of U.S. Ser. No. 17/334,334 filed on May 28, 2021 and issued under U.S. Pat. No. 11,203,294 on Sep. 16, 2021, which is a continuation of Ser. No. 17/024,535 filed on Sep. 17, 2020 and issued under U.S. Pat. No. 11,052,821 on Jul. 6, 2021, which is a continuation of Ser. No. 16/563427 filed on Sep. 6, 2019 and issued under U.S. Pat. No. 10,814,784 on Oct. 27, 2020, which is a continuation of U.S. Ser. No. 16/168,449 filed on Oct. 23, 2018 and issued under U.S. Pat. No. 10,434,943 on Oct. 8, 2019, which is a continuation of U.S. Ser. No. 15/885,412 filed on Jan. 31, 2018 and issued under U.S. Pat. No. 10,137,834 on Nov. 27, 2018, which is a continuation of U.S. Ser. No. 15/277,037 filed on Sep. 27, 2016, issued under U.S. Pat. No. 9,919,648 on Mar. 20, 2018, all of which are herein incorporated by reference in their entirety.

BACKGROUND OF THE INVENTION

Motor vehicle accidents result in tens of millions of people being injured, disabled or even dying throughout the world each year. It has been estimated that motor vehicle accidents cause over 1.3 million worldwide deaths each year or over 3000 deaths each day. In addition to the human tragedy, road crashes cost over $500 billion globally per year. In the United States alone over 37,000 people die on road crashes each year and an additional 2.3 million are injured or disabled. Clearly the seriousness of the situation requires diligent efforts to reduce motor vehicle accidents. Vehicle design, roadway engineering, police and law enforcement efforts and technological improvements in vehicle safety and warning systems are all important areas. See, for example, Association for Safe International Road Travel, 2002-2016. http ://asirt.org/initiatives/informing-road-users/road-safety-facts/road-crash-statistics.

This invention addresses this growing and serious problem through an innovative combination of technologies and advanced information gathering and processing methods in a comprehensive integrated motor vehicle danger warning and control system. Information from automotive sensors, passenger activity sensors, driver medical condition sensors, roadway condition sensors, pedestrian congestion and traffic measurement sensors are combined in an integrated system making use of artificial intelligence expert systems to derive motor vehicle warning and control signals with the goal of minimizing the occurrence of accidents while maintaining driver communication capabilities to report dangerous situations requiring immediate assistance. In this invention, artificial intelligence expert systems technology simulates human reasoning to derive logical responses to dangerous driving situations by integrating large amounts of information into informative driver warnings and motor vehicle control signals.

A particular concern in motor vehicle safety is the increased use of cellular telephone technology. Recent studies indicated that by the end of 2015 there were as many as seven billion cellular telephones worldwide. This compares to an equal worldwide population of about seven billion people. While this universal adaptation of cellular telephone technology has led to many improvements in the quality of life to billions of people, it has, at the same time, introduced several unique problems with serious consequences resulting from improper use of cellular telephones.

A particular area of concern involves the use of cellular telephones or other wireless devices while driving motor vehicles. For example, the National Safety Council (NSC) estimates that, in the United States, 21 percent of crashes or 1.2 million crashes in 2013 involved talking on handheld and hands-free cell phones. The NSC also estimates an additional 6 percent or more of crashes or a minimum of 341,000 of crashes in 2013 involved text messaging. Thus, the NSC estimates a minimum of 27% of crashes involve drivers talking and texting on cell phones. These alarming statistics led to the NSC's call for a ban on cell phone voice and texting use while driving. See National Safety Council, "Annual Estimate of Cell Phone Crashes—2013,"© NCS report, 2015, page 1.

Furthermore, recent studies have concluded that uses of cellular telephones for voice communication or texting are only part of the problem. The AAA Foundation for Traffic Study has published a report stating that it has been estimated that driver inattention has accounted for 25% of all police reported crashes. Other studies indicate that such inattention was a factor in 78% of all crashes or near crashes making it the single largest crash causation factor. See AAA "Measuring Cognitive Distraction in the Automobile," AAA Foundation for Traffic Study, June, 2013, page 4. The AAA study concluded that on a cognitive distraction scale, driver conversations with other passengers in a motor vehicle, the use of hand-held cellular telephones and the use of hands-free cellular telephones all give rise to about equal cognitive distraction. In all three of these cases cognitive distraction varied from 2.27 to 2.45 times that of non-distracted, single task driving conditions. The use of speech-to-text technology increases cognitive distraction to about three times that of non-distracted, single task driving conditions. Interestingly, hands-free cellular telephone technology offers minimal cognitive distraction advantage over the use of hand-held cellular telephones and rates only slightly better than having a conversation with other passengers in the vehicle. See above AAA study, page 28. See also, NSC, "Understanding the distracted brain—Why driving while using hands-free cell phones is risky behavior." National Safety Council White Paper, April, 2012.

The seriousness of the situation has led to various technological suggestions for reducing or eliminating the use of cellular telephones by drivers while operating a motor vehicle while still allowing other passengers in that vehicle to use their cellular telephones for voice calls and texting in a normal manner. Prior art systems and methods attempting to address this need include the following:

Joel Vidal and Yael Vidal, U.S. Pat. No. 8,538,402, "Phone That Prevents Texting While Driving," is directed in part to determination that a user of the phone is sitting in a driver seat of a moving vehicle based on captured images and/or contextual analysis of voice or text messages. Use is also made of GPS location information and possibly other parameters to control cellular telephone usage.

Saled Tadayon and Maryam Halavi, U.S. Pat. No. 8,145,199, "Controlling Mobile Device Functions," assigned to BT Patent LLC, is directed in part to controlling mobile device functions by limiting or disabling features which may cause distractions to the user including the use of cellular telephones for voice or texting purposes. Use is made of a coded signal transmission from a transmitter in the vehicle to assist in determining that the cellular telephone of concern in the moving vehicle is being used by the driver of that vehicle.

Curtis A. Vock and Perry Youngs, U.S. patent Applications Ser. No. 12/818,044 (Publication No. 20100323615—abandoned) and 20130288744, are directed in part to a mobile device that includes a GPS sensor and a motion module that disables communication through the mobile device when in motion. A limited range transmitter/receiver configuration is used to assist in the determination that the mobile device of concern is being used by the driver of a moving vehicle.

Robert L. Mendenhall, et. al., "Intra-vehicular Mobile Device Usage Detection System and Method of Using the Same," U.S. Pat. Nos. 8,295,890 and 8,060,150 are both directed in part to the use of a directional antenna in a vehicle configured and positioned to detect mobile device radio signals from the driver area in the vehicle with storage of mobile device usage data that may be useful to the trucking, train, bus, and mass transit industries in order to educate drivers about the dangers associated with using mobile devices while driving.

Camp, Jr., et al., U.S. Pat. No. 7,697,917, "Method for safe operation of mobile phone in a car environment," is directed in part to electronic equipment utilizing a wireless signal to communicate, including determining if the electronic equipment is operated within a moving vehicle based on a characteristic of the wireless signal and inhibiting operation of the electronic equipment if the electronic equipment is in a moving vehicle. Possible use of near field communication sensors (NFC) to determine if the driver is using the electronic device is discussed.

Abramson, et al., U.S. Pat. No. 8,750,853, "Sensor-based determination of user role, location, and/or state of one or more in-vehicle mobile devices and enforcement of usage thereof," is directed in part to analysis of one or more inputs originating at one or more sensors of one or more devices in a in a moving vehicle to assist in determination of vehicle class, the in-vehicle location, hand held state of a mobile device with systems and methods for restricting operation of a mobile device, including restrictions that impede operation by a driver more so than operation by a passenger. Possible use of near field communication sensors (NFC) to determine if the driver is using the electronic device is discussed.

Slusar, et al., U.S. Pat. No. 9,086,948, "Telematics based on handset movement within a moving vehicle," is directed in part to a system for providing telematics data associated with a vehicle being driven by a driver obtained by tracking the movements of a wireless communications device of a driver of the vehicle. The telematics data may provide, among other things, speed, acceleration, deceleration, times of operation, duration of operation, mileage driven per day, and day of the week the vehicle has been used. Possible use of near field communication sensors (NFC) to determine if the driver is using the wireless communications device is mentioned.

Xiao, et al., U.S. Pat. No. 8,634,816, "Limiting mobile device services in an automobile," is directed in part to a system for determining whether a mobile communication device is in a driver compartment of an automobile. The method may include determining whether the automobile is in motion or not in motion. Further, the method may include redirecting a call to the mobile communication device when the mobile communication device is in the driver compartment and the automobile is in motion. Possible use of near field communication sensors (NFC) to determine if the driver is using the wireless communications device is mentioned.

Additional prior art directed to technologies useful in some embodiments of the present invention includes:

M. Brandstein and D. Ward, "Microphone Arrays," Springer, Berlin, Germany and New York, 2001, dealing with the configuration and theoretical foundations of microphone arrays.

J. Benesty, et. al., "Microphone Array Signal Processing," Springer, Berlin, Germany and New York, 2008, dealing with the configuration and theoretical foundations of microphone arrays and digital signal processing of signals produced from such arrays.

Chen, C. H., "Fuzzy Logic and Neural Network Handbook," McGraw-Hill, New York, 1996.

Cox, C., "The Fuzzy Systems Handbook," Academic Press Inc., 1994.

All of the above are incorporated herein by reference.

New and improved systems and methods are needed to reduce or eliminate dangerous driving situations involving cognitive distractions including distracting conversations with vehicle passengers or the use of telecommunication devices or cellular telephones for voice communications or texting and that also take into account dangerous driving conditions including, for example, dangerous roads, traffic congestion, pedestrian traffic, day/night driving, weather conditions as well as motor vehicle condition including, for example, possible brake problems, tire problems, automotive engine problems or other motor vehicle problems that may contribute to increased accident probability. More particularly, none of the above prior art systems or methods make use of artificial intelligence with expert system analysis involving combinations of motor vehicle motion sensor technology, directional RF antenna technology, near field communications technology, microphone array technology with acoustic beamforming and noise cancellation, speech-to-text technology, image analysis, driver medical emergency situations and integration of vehicle telematics reporting vehicle safety problems. What is needed is a totally integrated operational electronic system that takes advantage of these modern technologies to reduce motor vehicle accidents and injury to passengers and/or pedestrians resulting from driver cognitive distractions, dangerous road and driving conditions, and motor vehicle problems while still ensuring a driver may use cellular telephone or other wireless communication devices to report medical conditions or critical driving situations requiring immediate assistance.

SUMMARY OF THE INVENTION

Various embodiments of systems and methods for improved warning of drivers of dangerous driving situations and for control of the use of cellular telephones and/or other wireless telecommunication devices by drivers of a moving vehicle are disclosed. In one aspect of this invention, electronic specifically programmed motor vehicle device control system and methods are disclosed, with at least one specialized electronic communication computer machine including electronic artificial intelligence expert system decision making capability using one or more motor vehicle electronic sensors capable of monitoring activities of the motor vehicle and the driver and/or passengers including activities related to the use of cellular telephones and/or other wireless communication devices and further comprising electronic communications transceiver assemblies for communications with external sensor networks to obtain information on weather conditions, roadway conditions, pedestrian traffic and/or traffic congestion conditions and other dangerous situations wherein the electronic specifically programmed motor vehicle device control system and methods make use of artificial intelligence expert system decision making capability based on the electronic sensor inputs to derive warning and control signals for warning the driver of dangerous driving situations and/or for controlling the motor vehicle driver use of the cellular telephone and/or other wireless communication devices.

In a further aspect of some embodiments of the invention, the electronic specifically programmed motor vehicle device control systems and methods electronic sensors comprise near field communication sensors.

In a further aspect of some embodiments of the invention, the electronic specifically programmed motor vehicle device control systems and methods electronic sensors comprise noise reduction beamforming microphone arrays.

In a further aspect of some embodiments of the invention, the electronic specifically programmed motor vehicle device control systems and methods electronic sensors comprise interference reduction directional RF antennas.

In a further aspect of some embodiments of the invention, the electronic specifically programmed motor vehicle device control systems and methods electronic sensors comprise image cameras for use with image analysis software.

In yet a further aspect of some embodiments of the invention, the electronic specifically programmed motor vehicle device control systems and methods are specifically programmed to derive artificial intelligence expert system measures of road/weather indices based external sensor network signals reporting road-way and/or weather conditions.

In a further aspect of some embodiments of the invention, the electronic specifically programmed motor vehicle device control systems and methods are specifically programmed to derive artificial intelligence expert systems driving warning indices based on the above derived road/weather indices and external sensor network inputs reporting pedestrian and/or traffic congestion conditions.

In still a further aspect of some embodiments of the invention, the electronic specifically programmed motor vehicle device control systems and methods are specifically programmed to derive artificial intelligence expert system driver warning indices combining results of the artificial intelligence expert system above derivation of the driving warning indices with motor vehicle sensor inputs reporting driver distractions from the use of wireless communication devices or cellular telephones or other driver or passenger distracting activities giving rise to dangerous driver situations.

In yet another aspect of some embodiments of the invention, the electronic specifically programmed motor vehicle device control systems and methods derive driver warning indices based on fuzzy logic calculations.

In still a further aspect of some embodiments of the invention, the electronic specifically programmed motor vehicle device control systems and methods use the results of the artificial intelligence expert system and/or fuzzy logic calculations to lock out or inhibit the use of a cellular telephone or other wireless communication device by the driver of the motor vehicle.

In a further aspect of some embodiments of the invention, the electronic specifically programmed motor vehicle device control systems and methods may ignore derived cellular telephone or other wireless communication device lock-out or inhibiting control to permit emergency communications by the driver of the motor vehicle such as the placing of "911" calls or other emergency calls requiring immediate assistance.

These and other aspects of the invention herein disclosed are disclosed below.

BRIEF DESCRIPTION OF THE DRAWINGS

While the present invention is amenable to various modifications and alternative forms, specific embodiments thereof are shown by way of example in the drawings and will herein be described in detail. The inventions of this disclosure are better understood in conjunction with these drawings and detailed description of the preferred embodiments. The various hardware and software elements used to carry out the inventions are illustrated in these drawings in the form of figures, block diagrams, flowcharts and descriptive tables setting forth aspects of the operations of the invention.

It should be understood, however, that the drawings and detailed descriptions are not intended to limit the invention to the particular form disclosed, but on the contrary, the intention is to cover all modifications, equivalents and alternatives falling within the spirit and scope of the present invention as defined by the appended claims.

FIG. 12 depicts, without limitation, exemplary artificial intelligence expert systems sensor decision matrix for motor vehicle driver activity sensors of FIG. 11B.

FIG. 15A depicts, without limitation, an exemplary artificial intelligence expert system decision matrix for a road-weather warning index based on dangerous roadway and weather conditions on roadways or highways being traveled by the motor vehicle.

FIG. 15B depicts, without limitation, an exemplary fuzzy logic analysis of the expert systems artificial intelligence road and weather conditions matrix of FIG. 15A to produce a crisp single road/weather warning index.

FIG. 15C depicts, without limitation, an exemplary artificial intelligence expert system decision matrix for a vehicle driving warning index based on traffic and the derived road-weather warning index of FIG. 15B.

FIG. 15E depicts, without limitation, an exemplary artificial intelligence expert systems decision matrix for a driver warning index based on driver distraction and the vehicle driving warning index of FIG. 15D.

DETAILED DESCRIPTION

The above figures are better understood in connection with the following detailed description of the preferred embodiments.

System and Methods Description

Figure 1:
FIG. 1 illustrates, without limitation, a moving vehicle interior typical of the moving vehicle interior environment of this invention.

FIG. 1 depicts, without limitation, a typical interior environment (101) of a moving vehicle (100) of the type addressed by this invention. In the depiction of FIG. 1, two passengers (103) and (105) are illustrated occupying the front seats of the vehicle. The passengers are wearing seatbelts (107) indicating they are in a moving vehicle or intending to be in the vehicle while it is moving. Other interior objects of the moving vehicle (100) useful in characterizing activities in the motor vehicle include, for example, the steering wheel (106).

This invention discloses apparatus and methods for determining when the driver (103) of the moving vehicle (100) is using a telecommunication device such as a cellular telephone for voice or text communication while the vehicle is moving. The inventive systems and methods of this invention further include the capability of combining detected dangerous driver activities with dangerous roadway, traffic and/or weather conditions and/or other driver distractions to provide a comprehensive warning of danger situations presented to the driver and occupants of the motor vehicle. At the same time, the apparatus and methods of this invention are conceived to permit the usage of a telecommunications device or cellular telephone by other passengers, such as passenger (105), of the moving motor vehicle (100) who are not driving the vehicle.

As depicted in FIG. 1, a device control unit (102) monitors the interior environment (104) of the moving vehicle (100) to detect dangerous activities and situations including determination of when the driver (103) is using a telecommunications device such as a cellular telephone or other wireless device while driving and further for issuing driving warnings and/or transmitting control signals to inhibit such use while the vehicle is moving. The same device control unit (102) is configured to isolate such control to the driver (103) while permitting use of telecommunication devices or cellular telephones by passengers (104). While the environment of FIG. 1 is shown with only two passengers, the same device control unit (102) may be configured to provide the same warnings and/or inhibiting control of the driver use of such telecommunication devices in vehicles with more than two passengers.

Figure 2:
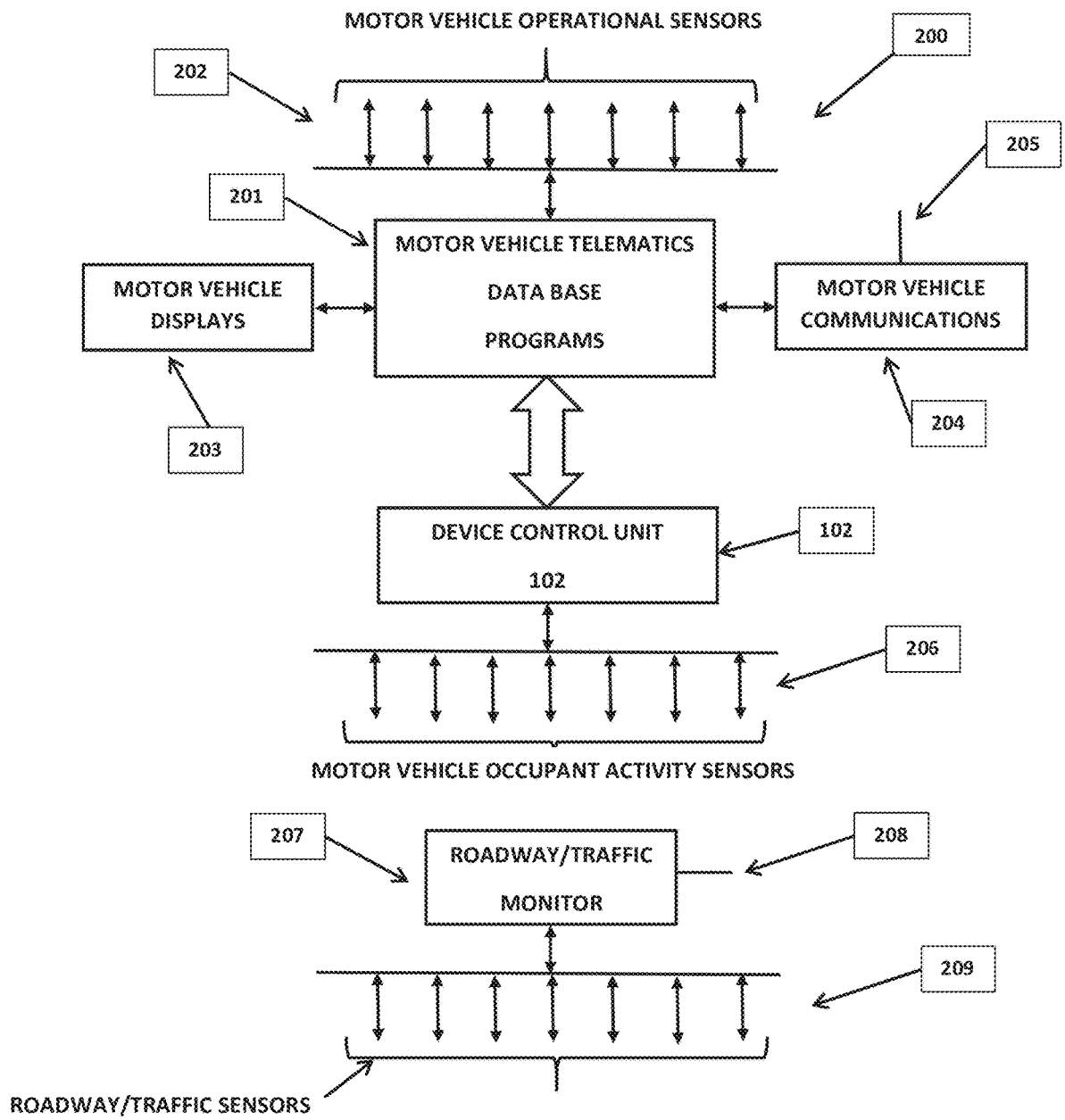
FIG. 2 illustrates, without limitation, a sensor and control configuration of this invention.

FIG. 2 depicts, without limitation, a motor vehicle sensor and control configuration (200) useful in the present invention. The configuration (200) includes the device control unit (102) of FIG. 1. The device control unit (102) is connected to motor vehicle occupant activity sensors (206) for the purpose of monitoring activities of the driver and passengers within the motor vehicle. The purpose of the sensors (206) is to determine activities within the motor vehicle that might give rise to a distraction to the driver that results in a dangerous driving situation. Those activities may include the use of a cellular telephone or other wireless device for talking or texting and/or activities of other passengers in the motor vehicle that may be distracting to the driver. The occupant sensors (206) may include Near Field Communication (NFC) sensors, microphone sensors, cameras sensors, RF signal sensors or other sensors useful to monitor passenger activities.

As shown in FIG. 2, the device control unit (102) also communicates with the motor vehicle telematics database and programs (201). The telematics unit (201) is also interfaced to motor vehicle displays (203) including dashboard displays, gauges and screen displays used to inform the driver of automobile of driving conditions as well as to provide interface and control to other vehicle systems such as entertainment, climate control, navigation, communication and other motor vehicle systems. The motor vehicle telematics unit (201) also interfaces to multiple motor vehicle operational sensors (202) including for example, tire pressure sensors, braking system sensors, fuel sensors, oil sensors, temperature sensors, vehicle maintenance warning sensors, lighting system sensors, headlight taillight and braking system sensors, turn signal sensors, exterior camera and proximity sensors, road tracking sensors, erratic driving behavior sensors, location sensors, weather sensors and any other sensors used to monitor motor vehicle status and driving conditions.

As further illustrated in FIG. 2, the motor vehicle telematics unit (201) connects to the motor vehicle communications system (204) for communications with remote information and control systems. The motor vehicle communication system (204) communicates via radio frequency signals with antenna (205) with these remote systems. Such systems may include traffic control systems, weather reporting systems, road conditions systems, police or law enforcement systems, emergency alert systems and the like.

An additional roadway traffic safety concern involves pedestrians being struck by motor vehicles. A report issued by the Governors Highway Safety Association (GHSA) estimates the number of pedestrian fatalities jumped 10% in 2015 after a 19% increase from 2009 to 2014. See Pedestrian Traffic Fatalities by States—Preliminary Data, 2015, GHSA, June 2015. That report estimates that for the first time in 25 years, pedestrian deaths in 2015 are projected to account for 15% of traffic fatalities. It has been reported that a 2010 study indicated that pedestrian fatalities caused by distracted motor vehicle drivers increase by 50% over five years. Factors of concern include pedestrian traffic density with an increased number of pedestrians being present at special events such as concerts and sporting events, increase pedestrian traffic in specific locations such as school zones, shopping districts, parks, business districts or other areas with increased number of people walking around. Another factor is the rise in "walkable communities" with more people walking or bicycling to work. See Dallas Morning News, Mar. 9, 2016, page 9A. Warnings of dangerous pedestrian traffic situations may be reported to the motor vehicle telematics unit (201) by the motor vehicle communications Center (204) of FIG. 2. In this way such pedestrian traffic information is made available for use in evaluating roadway/traffic dangerous factors in the overall driver warning calculations of this invention.

Roadway/traffic monitor unit (207) interfaces with multiple roadway/traffic sensors (209) as also shown in FIG. 2. The roadway/traffic monitor unit (207) may be consolidated as part of a comprehensive roadway and traffic monitoring system or may represent multiple such monitoring systems including law enforcement monitoring systems, roadway monitoring systems, traffic monitoring systems, accident reporting systems, roadway construction systems and other such systems that may be employed to monitor roadway and traffic conditions. The results of such monitoring may be transferred by one or more antenna systems (208) to motor vehicle communication units (204) by antenna (205). The results of such exterior roadway and traffic monitoring may be used in the artificial intelligence expert system embodiments of this invention as described further below.

Figure 3:
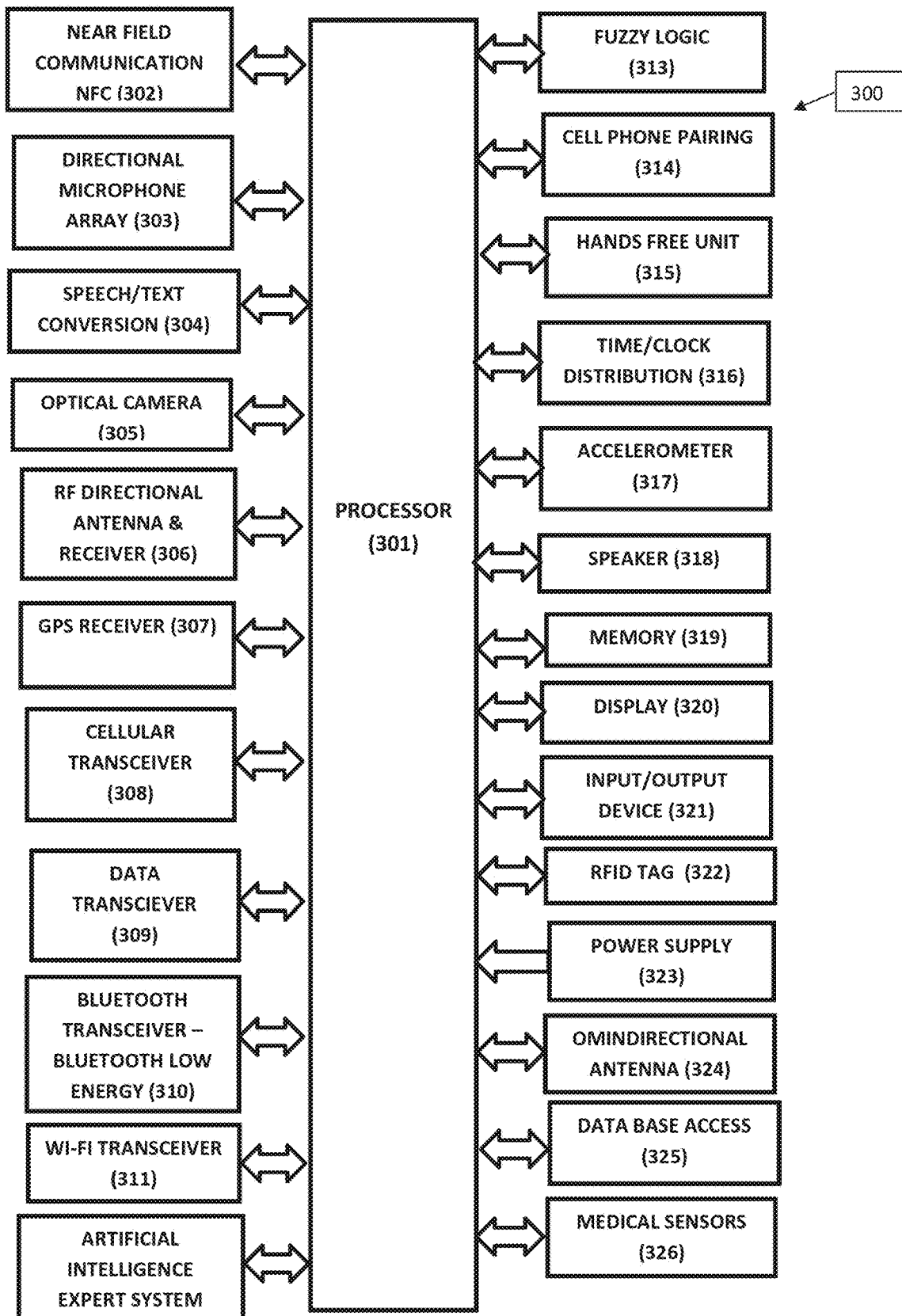
FIG. 3 depicts, without limitation, in block diagram form a device control unit with capabilities useful for this invention.

FIG. 3 depicts, without limitation, a block diagram of possible elements of an exemplary device control unit (300) corresponding to device control unit (102) of FIG. 1. The device control unit (300) of FIG. 3 depicts a comprehensive collection of possible capabilities of the device control unit (102) of FIG. 1. It is to be understood that the device control unit (102) of FIG. 1 and as described elsewhere in this specification or in different embodiments of this invention may include all or a selected subset of the total capability of the device control unit (300) of FIG. 3.

The processor (301) may be of any suitable configuration known to those of skill in the art. For example, the processor (301) may be a computer, microprocessor, a DSP (digital signal processor), or other control circuitry suitable for this application. In addition, the processor (301) may be configured using a combination of these technologies.

As shown in FIG. 3, the device control unit may include multiple interconnected capabilities that may be attached to or designed as an integral part of the hardware or software of the processor (301). These various capabilities useful in the operation of the device control unit of this invention are characterized below and discussed more completely below in association with the additional FIGS. 4-10.

As indicated in FIG. 3, the device control unit (300) may include hands-free unit (315) permitting operation of a telecommunications device or cellular telephone in a hands-free mode. Such units may connect to a telecommunications device or cellular telephone using, for example conventional Bluetooth or Bluetooth Low Energy (BLE) (310), Wi-Fi (311) or other radio frequency data transceiver (309) communication links. The hands-free unit (315) permits answering, placing and carrying on voice or text communications via an external cellular telephone network using voice commands only without requiring the driver to hand-manipulate or operate telecommunications or cellular telephone equipment while driving.

As indicated in FIG. 3, the device control unit may also include connections to near field communication (NFC) sensors (302) to assist in determination that the driver of the motor vehicle is using a wireless communication device such as a cellular telephone. As explained further below NFC sensors may be used to detect the use of a cellular telephone in close proximity to that sensor, typically within 10 cm to 20 cm distance. Such sensors operate through magnetic induction and are being implemented today in a variety of devices to detect the presence of items of interest and to exchange information with such items for the particular purposes being served.

As also indicated in FIG. 3, the device control unit (300) may include one or more directional, beamforming microphone arrays (303). Such directional, beamforming microphone arrays are useful in isolating and capturing audio voice signals from individual speakers in the presence of interfering signals from other speakers and other environmental noise signals. For example, in the environment depicted in FIG. 1, environmental noise signals may include audio signals generated from other sources including other passengers, radio, automotive engine and vehicle operation and external noises such as generated by traffic or wind outside of the vehicle or other road noises. Directional beamforming microphone arrays are particularly useful in isolating speech signals of a desired speaker to the exclusion of other noise signals in the environment of the speaker.

As also shown in FIG. 3, the device control unit (300) may include a speech-to-text conversion capability (304). In some embodiments of this invention the speech-to-text conversion capability (304) may be used to convert speech signals received from the directional microphone arrays (303) to text form, as well as for conversion of speech signals received by the device control unit (300) from the telecommunication device or cellular telephone being used by the vehicle driver to for texting. The device control unit (300) may compare the converted text form of speech signals received from the directional microphone arrays with those received from the telecommunication device cellular telephone as part of the verification that the driver is indeed using those communication devices while driving as explained further below. Also, in some embodiments, the speech/text conversion capability (304) may be used to convert text information or messages to speech enabling communicating with the driver of the motor vehicle or others in the motor vehicle in an audible, recognizable speech format. This capability may be important in some embodiments for system control and providing audible instructions or warnings to the driver and/or other occupants of the motor vehicle, informing them of dangerous situations or activities.

As also shown in FIG. 3, the device control unit (300) may include an optical camera (305) for capturing images of the driver of a moving vehicle to assist in the determination of situations where the driver is using or attempting to use a telecommunications device such as a cellular telephone while the vehicle is moving. In some embodiments of this invention, the optical camera (305) may be capable of taking multiple individual photos or videos encompassing the driver of the vehicle in isolation or other areas of the vehicle. For example, photographing or taking videos of other areas of the vehicle may be of assistance in determining the presence or absence of other passengers in the vehicle and ascertaining their conversational activities and/or their use of separate telecommunications devices or cellular telephones.

The optical cameras (305) of FIG. 3 may also be used with image analysis software to perform such tasks as facial recognition to identify particular drivers. The device control unit (102/300) may be used to maintain history files of motor vehicle drivers with histories of their driving habits including dangerous driving tendencies. Particular drivers present increase risks for automobile accidents including for example teenagers and especially teenage boys. Facial recognition may be used to assist in identifying drivers.

The optical cameras (305) of FIG. 3 may also be used to analyze specific motions of the driver of a motor vehicle including, for example, raising of a cellular telephone or other wireless device to the driver's ear for use. Such optical cameras may make use of motion sensitive detection capability such as used today in video game systems.

As also shown in FIG. 3, the device control unit (300) may include an RF (radio frequency) directional antenna and receiver (306) to receive and detect radio signals emanating from the area of the driver of a moving vehicle. For example, such signals may originate as cellular telephone signals, Bluetooth signals, Wi-Fi signals, or other communication or control signals. This same RF (radio frequency) directional antenna and receiver (306) may also be used to selectively transmit such signals into the selected area occupied by the driver of a moving vehicle.

As further indicated in FIG. 3, the device control unit (300) may include a GPS (Global Positioning System) receiver (307) useful for tracking the location and movements of the motor vehicle. The Global Position System (GPS) makes use of triangulation calculations of positions based on signals received, for example, from multiple geostationary satellites. Such systems provide location information accurate within approximately one meter. Massive databases exist providing GPS coordinates for virtually every addressable location in the United States and elsewhere. Mobile communication networks implement Home Location Registries (HLRs) and Visitor Location Registries (VLRs) providing instant location information for mobile wireless devices through the country. Such databases also provide detailed maps of highways and roadways used by motor vehicles. Such route maps and location information may be used in the present invention to verify that the motor vehicle is indeed traveling on established highways or roadways and further to provide markings of the location of such a vehicle as a function of time along those known routes. This information can be used in combination with accurate time/clock information available to the device control unit (300) of this invention using, for example, time/clock distribution unit (316) shown in FIG. 3. Knowing the elapsed time interval between successive points with known distance between those points permits computation of the speed of the moving motor vehicle. This information may, in-turn, be used for comparison with pre-established motor vehicle speed thresholds and predetermined locations. The results of such comparisons can be used by the device control unit (300) of this invention to determine when to initiate computations and processing prior to issuing a warning to the driver of danger or a command that inhibits operation of a telecommunications device or cell phone by the driver of a moving vehicle.

Motor vehicle location information may also be derived based on the vehicle distance from cellular telephone towers or other known fixed locations transmitting signals that may be received by one of the receivers of the device control unit (300) of FIG. 3. Here again, triangulation calculations may be made using three or more such location transmission signals.

As also shown in FIG. 3, the device control unit (300) may include a cellular transceiver (308) used to receive and transmit cellular communication information between the device control unit (300) and external sources accessible to the cellular telephone network or a telecommunication device or cellular phone located in the motor vehicle being used by a passenger or the driver of that vehicle.

In addition, as shown in FIG. 3, the device control unit (300) may further include a data transceiver (309) useful for communications with other devices in the motor vehicle including vehicle information systems, control and display systems, as well as telecommunication devices or cellular telephones used by passengers or the driver of the motor vehicle.

Similarly, as shown in FIG. 3, the device control unit (300) may also include a Bluetooth transceiver (310) and/or a Wi-Fi transceiver (311). Both Bluetooth and Wi-Fi transceivers are used for short range voice and data communications. In the present invention such transceivers may be used to communicate between device control unit (300) and the telecommunication device or cellular telephone used by the driver or other occupants of the motor vehicle. Such communications may be used to monitor transmit and receive signals and to provide full-duplex control communication between the device control unit (300) and the telecommunication device of interest. Transceivers (309), (310) and (311) may also be used to communicate with the motor vehicle operational sensors (202) of FIG. 2. Those operational sensors include, without limitation, near-field communication devices, directional microphone arrays, RF antennas, and cameras all used to monitor activities within the motor vehicle.

In some embodiments, the device control unit (300) of FIG. 3 may include artificial intelligence expert system technology (312) with the goal of improving decisions made by the device control unit (300). Such artificial intelligence expert system technology may prove especially beneficial in assessing the degree of danger and various situations. For example, danger may be higher when the motor vehicle is operated at higher speeds or with dangerous vehicle maneuvers. Other considerations in assessing such degrees of danger may include driving conditions such as whether conditions involving for example, rain, sleet, snow, ice or wind. In addition, artificial intelligence expert system technology may be used to incorporate traffic considerations such as traffic congestion, dangerous roadways such as narrow roads or switchback mountainous roads. Other considerations may include danger arising from road or highway construction activities. In addition, known road or highway problems such as the presence of potholes, dangerous curves, animal crossing areas or the like may be taken into consideration by appropriately designed artificial intelligence expert systems. Other examples of situations that may give rise to heightened dangers include emergency problems such as those arising from accidents on the roadway or highway being traveled, fires, criminal activities, or emergency vehicle traffic including fire trucks, ambulances or police or other government vehicles dispatched on an emergency basis to deal with crisis situations or pedestrian congestion resulting from large numbers of people or crowds in the areas being traveled by the motor vehicle. Such road way or highway conditions, weather alerts or other dangerous situations are frequently transmitted by appropriate government are roadway condition agencies for the purpose of alerting drivers of potentially dangerous situations. Such broadcast may be received for example by cellular transceiver (308) or data transceiver (309) or other appropriate receivers designed to receive such signals.

The artificial intelligence expert system capability (312) may also include "learning" capability, including the development of databases recording driving habits of particular drivers, such as driving acumen and the ability to react to particular potentially dangerous situations.

As also indicated in FIG. 3, the device control unit (300) may include fuzzy logic capability (313). Fuzzy logic is a method of representing analog processes on a digital computer. With fuzzy logic control, statements are written in the form of the propositional calculus logic statements. These statements represent somewhat imprecise ideas reflecting the states of the variables. Fuzzy logic is particularly appropriate when an expert is available to specify these propositional statements characterizing the relationships between system variables. In the present invention such propositional statements and fuzzy logic may be beneficial in analyzing the relationships between various parameters characterizing dangerous situations and responses to those situations as described more completely below.

Telecommunication device or cell phone "pairing" (314) may also be included in the device control unit (300) of the present invention. Such "pairing" permits a telecommunication device or cell phone to be connected to device control unit (300) by telecommunication links such as Bluetooth, Wi-Fi or the like. With these connections, voice or data communication signals transmitted to and from the telecommunications device or cellular telephone may be relayed through the device control unit (300) via the interconnecting telecommunication links. In addition, such "pairing" permits commands and responses to be communicated between a telecommunications device or cellular telephone and the device control unit (300). One intended use of such commands would be to inhibit operation of the telecommunications device or cellular telephone in dangerous situations.

In addition, as shown in FIG. 3, the device control unit (300) may further include a data-base access capability (325) connected to processor (301) for accessing and updating data-base information useful in the operation of the present invention. The data-base information may be stored locally as part of the device control unit (300), or maybe located remotely and accessible, for example, from the cloud through the Internet or cellular telephone communication networks. In some instances, database information may also be accessed from information stored and in other control and information data files implemented in the motor vehicle such as information stored for use by vehicle information display systems. Such vehicle information display systems may include information necessary for dashboard displays concerning vehicle operational status, speed, odometer readings, engine performance, fuel levels and warning signals. In addition, other control and information data files implemented in the motor vehicle may include files used to drive other on-board displays including, for example, touch screen displays or displays manipulated using point-and-click or other operator controls for navigating and selecting information to be displayed including, for example, navigation information and maps, vehicle status, weather, entertainment system control, telecommunication device control and the like. In some embodiments of this invention, information from device control unit (300) may in fact be displayed on such other on-board displays or may be made available for access by the motor vehicle driver passengers using such displays. In some embodiments of this invention the device control unit (300) may be integrated into and made an operational part of other vehicle control and/or display systems including, for example, the motor vehicle telematics unit 201 of FIG. 2.

In addition, as shown in FIG. 3, the device control unit (300) may further include a time/clock distribution capability (316) operating to make accurate date and time information available to the device control unit (300). Such information may be used, for example, in the calculation of vehicle speed by providing elapsed time between particular vehicle location points along a route of travel. Such time and date information may also be used to create history files recording occurrences of driver use of telecommunication devices or cellular telephones while driving the motor vehicle. In some embodiments such information may be shared with police or other government agencies to report dangerous driving activities of motor vehicle drivers. In some embodiments such information may be reported to vehicle owners or operators such as taxicab companies, trucking companies, rental car agencies or other equipment leasing or renting organizations employing or otherwise using drivers to operate their vehicles or equipment. Such reported information may be used, for example, to work with drivers to improve their driving habits, admonish drivers for bad behavior or to take other corrective action deemed necessary for safety or liability concerns.

In addition, as shown in FIG. 3, the device control unit (300) may further include accelerometer (317) capabilities. An accelerometer is a device that can measure the force of acceleration, whether caused by gravity or by movement. An accelerometer can therefore be used to measure or assist in the measurement of the speed of movement of an object to which it is attached. Because an accelerometer senses movement and gravity, it can also sense the angle at which it is being held. For example, solid-state accelerometers can sense the tilt, movement and speed being applied to them, and are commonly used for video game systems. As explained further below, such tilt sensitive accelerometers may be used to sense the orientation of driver telecommunication devices or cellular telephones to further assist in detecting dangerous use of such devices by the driver of a moving vehicle. Useful accelerometer technology includes piezoelectric, piezoresistive, resonant, strain-gauge, capacitance, tunneling, and heated liquid and gas accelerometers. Silicon MEMS accelerometers that work on the capacitive approach or ones that that are based on temperature differentials in heated-gas are useful in some embodiments of this invention. Such thermal accelerometers may be fabricated in monolithic structures with integration with all the necessary signal conditioning, interface and embedded circuitry on a single integrated circuit. Accelerometers are used today in automobiles for crash detection and airbag deployment and detection of automobile rollover accidents.

A speaker unit (318) may also be included as part of the device control unit (300). The speaker may be used to announce warnings or otherwise inform the driver or passengers in the vehicle of dangerous situations detected by device control unit (300). The speaker may also be used to instruct the driver or passengers using particular telecommunication devices or cellular telephones in the motor vehicle to discontinue use of those devices. The speaker may also announce that, for safety reasons, the device control unit (300) has taken automatic actions to disable particular telecommunication devices or cellular telephones being used in the motor vehicle.

In addition, as shown in FIG. 3, the device control unit (300) may further include associated memory (319) for storing software programs, vehicle information, measurement history information and other data useful or collected by the device control unit (300) in the operations of this invention. The associated memory (319) may comprise random access memory (RAM), read only memory (ROM), solid-state memory, disk memory, optical memories or any other appropriate memory technology known to those of skill in the art. While memory unit (319) is shown in FIG. 3 as a separate assembly, it is to be understood that some or all of such memory may be distributed among the various operational, control and communication capabilities illustrated in FIG. 3.

In addition, as shown in FIG. 3, the device control unit (300) may further include display capability (320) for displaying operational status and information concerning the operation and calculated results derived by the device control unit (300). Such information may include information reflecting potentially dangerous usage by the driver of the motor vehicle of telecommunication devices or cellular telephones while the vehicle is moving. The display (320) may be a separate display associated with device control unit (300), or, alternatively, the display (320) may be integrated with an operational part of other displays present in the motor vehicle including those discussed above such as the motor vehicle telematics unit 201 of FIG. 2. Useful display technologies include liquid crystal displays (LCD), light emitting diode displays (LED), plasma displays, smart glass, touch screen displays, menu-driven displays, and displays operated using speech commands or other suitable display technology.

In addition, as shown in FIG. 3, the device control unit (300) may further include additional input-output-device (321) capabilities. For example, standard USB ports may be used for such access. Other possibilities include the Common Flash memory Interface (CFI) approved by JEDEC and other standard memory unit interfaces. Other possibilities include audio input/output ports, video ports such as HDMI ports and other input/output capabilities.

As also shown in FIG. 3, the device control unit (300) may further include an RFID (radio frequency identification) tag device (322) used to identify the motor vehicle and communicate information or results from device control unit (300) to RFID tag readers located along highways tollways or roadways along which the motor vehicle is traveling. The RFID tag device (322) operating with device control unit (300) may be powered by power supply (323) of the device control unit (300) shown in FIG. 3 and discussed above. Alternatively, the RFID tag device (322) may be powered from externally generated electromagnetic energy waves emitted by an RFID tag reader. Information transmitted from the RFID tag device (322) may include information indicating dangerous usage of telecommunication devices or cellular telephones by the driver of the motor vehicle.

In addition, as shown in FIG. 3, the device control unit (300) may further include a power supply (323) necessary for operation of the device control unit (300) including the various capabilities depicted in FIG. 3. The power supply (323) may derive energy from the vehicle electrical power supply source or may be implemented as a separate battery or energy supply including, without limitation, solar energy, energy derived from external impinging electromagnetic waves, or energy derived from motor vehicle mechanical operations such as breaking or coasting.

As also shown in FIG. 3 device control unit (300) may include an omnidirectional antenna (324) useful for receiving RF signals from all directions as opposed to being limited to particular directions such as the case with the RF directional antenna and receiver (306) discussed above. For example, the omnidirectional antenna (324) may be useful in monitoring the use of telecommunication devices or cellular telephones by passengers of the motor vehicle other than the driver of that vehicle. As explained further below, in dangerous driving situations it may be appropriate to limit such use by other passengers because of distractions that may be caused to the driver of the vehicle. In other circumstances it may be appropriate to permit such usage by other passengers of the vehicle.

FIG. 3 also depicts the connection of driver medical sensors (326) with the device control unit (300). Such sensors may be wearable and used to monitor driver vital signs and general health conditions when driving the motor vehicle. Modern medical sensor technology includes short range telecommunications capability that enables transmission, detection and analysis of medical sensor signals derived from such wearable devices. Such sensors may be implemented in accordance with Internet of Things (IoT) technology and implementations being employed today in several distributed control and monitoring applications. IoT devices generally make use of short-range radio frequency communication capability such as Bluetooth, Low Energy Bluetooth (BLE), Wi-Fi, ISM or other such communication technologies. Conditions such as heart rate, blood pressure, breathing parameters, asthma conditions, incapacitation and/or other critical driver medical condition parameters may be monitored of the medical sensors (326). Such sensors may be configured for example, without limitation, as medical sensor cuffs, patches, implants, wrist bracelets, ankle bracelets, eyeball activity and/or condition sensors or other medical sensor technology implementations. Sensors used to monitor driver sobriety including alcohol intoxication or indication of the use of drugs such as marijuana, heroin and the like may also be included with the medical sensors (326) of FIG. 3. Driver intoxication from alcohol or drug use gives rise to impairment of judgment, reaction time or ability to deal with dangerous situations and is a major cause of automobile accidents.

As explained further below, in certain medical emergency situations it may be unacceptable or inappropriate to block the driver usage of cellular telephone or wireless device technologies for the purpose of summoning help or assistance during such medical emergency. Also, detection of a medical emergency situation may be the basis for issuing a warning to the driver of a dangerous medical condition and advising the driver to safely bring the motor vehicle to a halt and to seek medical assistance. For these are reasons, integration of the outputs of medical sensors (326) into the overall artificial intelligence expert system warning and control system herein described may be an important consideration in the implementation of such a system.

It is to be understood that while the device control unit (300) of FIG. 3 is depicted and described above as a unitary assembly, it is also possible, and in some cases desirable, that perhaps some of the operational features shown in FIG. 3 are shared and possibly implemented as part of other automobile control, communications, processing and/or display capabilities such as the motor vehicle telematics unit (201) of FIG. 2. In addition, it should be clear that several of the operational capabilities of the device control unit (300) of FIG. 3 may be implemented with distributed devices and/or capabilities located throughout the motor vehicle and communicating with the processor (301) as indicated in FIG. 3.

It should further be understood that other embodiments of the systems and methods of this invention may use a subset of the capabilities depicted in FIG. 3 without departing from the fundamental integrated system and method teachings of this invention.

Sensor Systems and Methods Description

Figure 4:
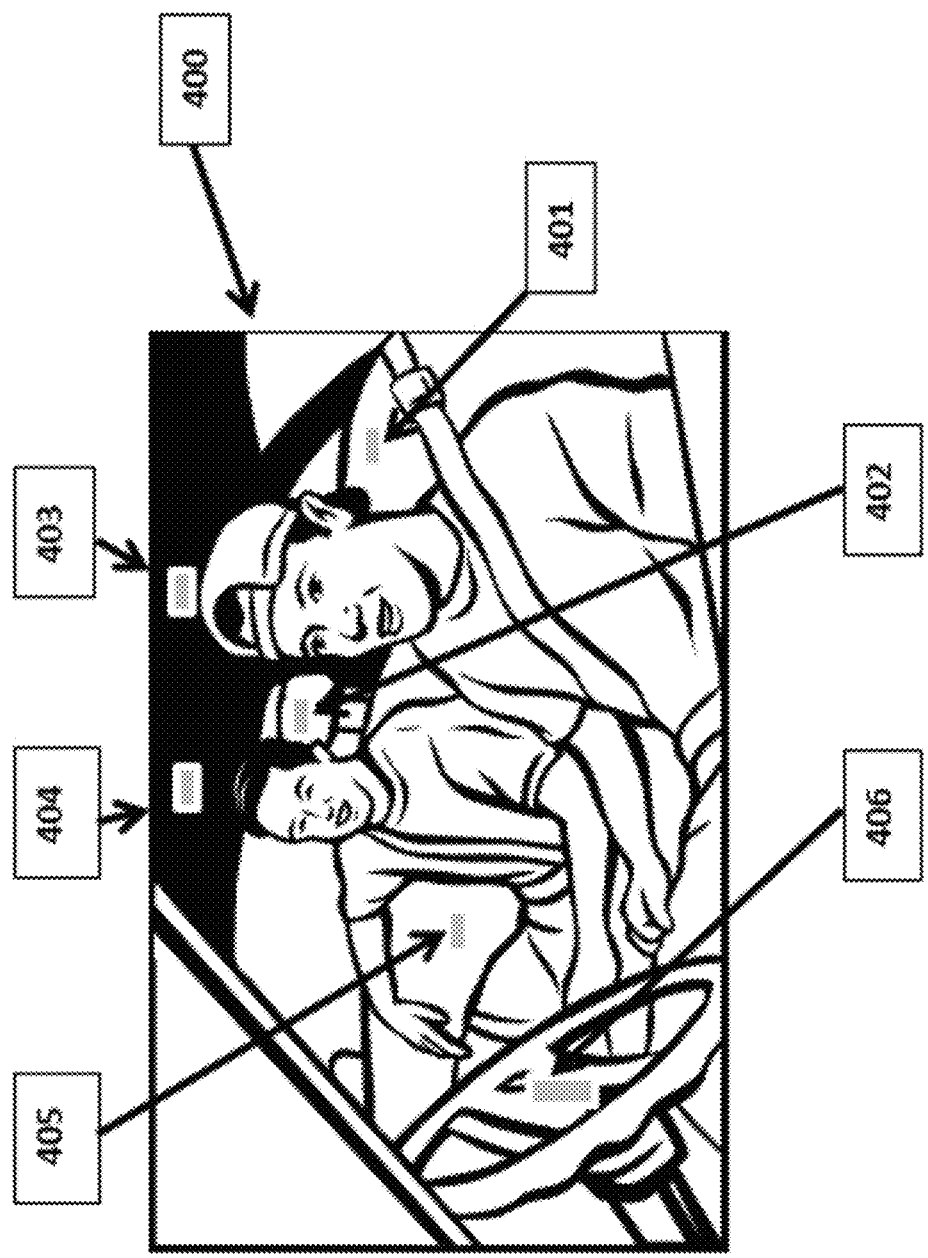
FIG. 4 illustrates, without limitation, example placement of near field communication sensors in a vehicle interior.

FIG. 4 depicts, without limitation, the possible location of proximity sensors such as Near Field Communication (NFC) proximity sensors to detect particular electronic devices such as cellular telephone, tablet computers or other electronic communication devices being used by particular passengers in particular locations in the motor vehicle (400). For example, proximity sensor (401) may be located at the rear top of the driver's seat in close proximity to the driver's head to detect possible use of such electronic devices by the driver. Similarly, proximity sensor (402) may be placed at the top of the front passenger seat to monitor the use of such electrical devices by that passenger. Other possible locations of such sensors include the motor vehicle interior roof or head-liner near the head of the driver and/or passenger illustrated by proximity sensors (403) and (404) to detect the use of such electronic devices. Texting or other manual use of handheld devices such as cellular telephones and/or laptop computers are generally carried out in or near the lap of the driver or passengers. The location of proximity sensors, such as NFC sensors, may include the door side panel proximity sensor (405) or proximity sensor (406) located in the steering wheel to detect operation of such electronic devices located in the general lap area of the passenger or driver. Similar sensor locations, not shown, may be used to monitor activities of passengers in other seats of motor vehicles.

Figure 5:
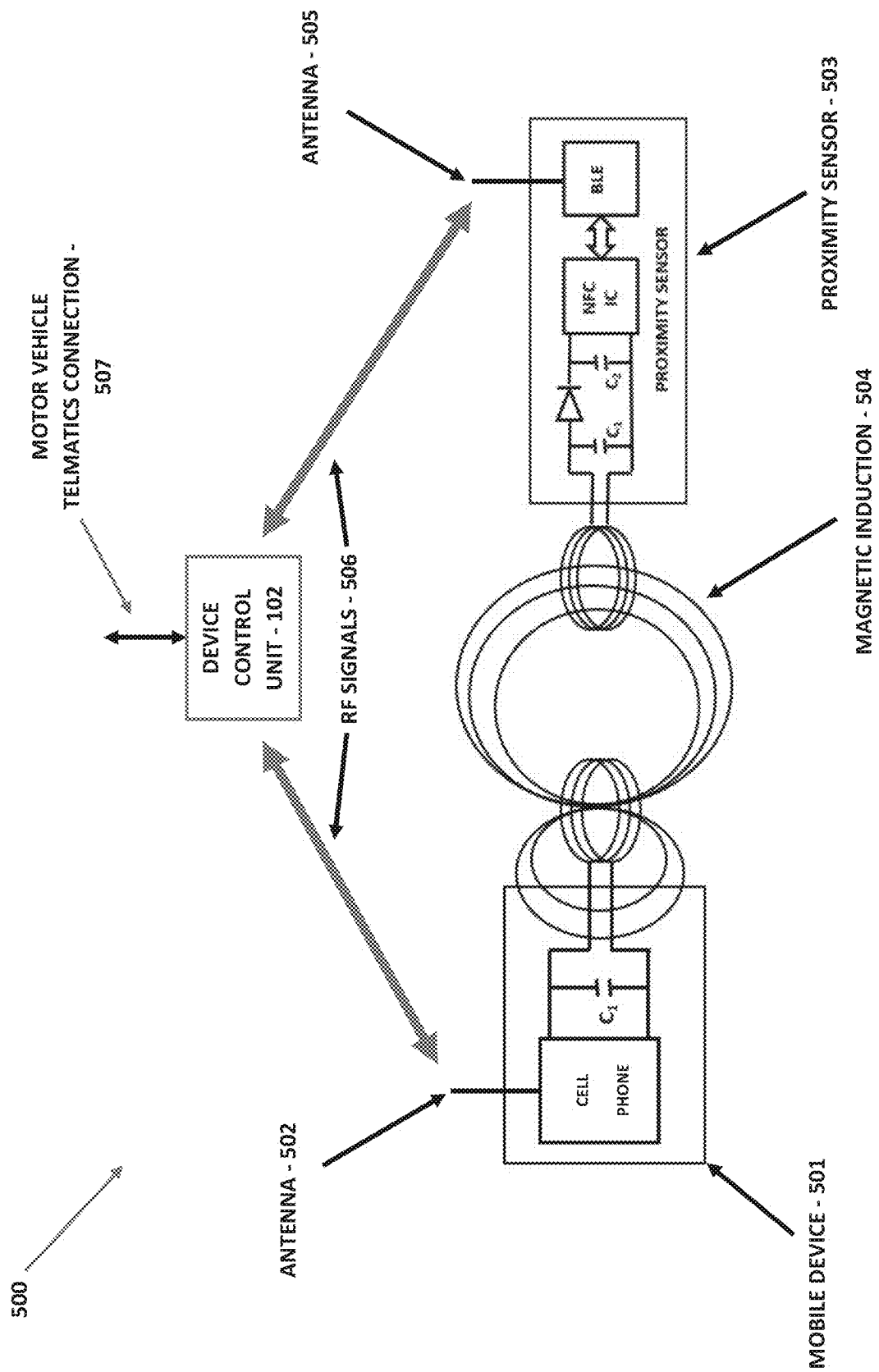
FIG. 5 illustrates, without limitation, integration of near field communication sensors in an embodiment of this invention.

FIG. 5 depicts, without limitation, an embodiment (500) involving NFC with a mobile device (501) coupled by magnetic induction (504) to a proximity sensor (503) of the type illustrated in FIG. 4. NFC is a set of short-range wireless technologies, typically operating at a separation of 10 to 20 cm or less. NFC standards specify operation at 3.56 MHz with data rates from 106 Kbits/sec to 424 Kbits/sec. The NFC tag may be a read-only device or may also include writable memory. NFC uses magnetic induction (504) between two loop antennas forming an air core transformer as illustrated in FIG. 5. NFC technology is included in many smart phones available today. NFC is used, for example, for personal data storage such as debit or credit card information, loyalty program data, Personal Identification Numbers (PINs), etc.

In the embodiment of FIG. 5, the NFC reader is incorporated in the mobile wireless device (501). The NFC reader may be activated when the user of the mobile device is attempting to make a cellular telephone call or otherwise use that device. When activated, the NFC reader will detect the proximity sensor mounted in the motor vehicle as described above. The mobile device may report the detection to the device control unit (102/300) via RF signals (506) transmitted and received via antennas (502) and 505) as illustrated in FIG. 5. The device control unit (102) may then determine which of the multiple NFC proximity sensors located in the motor vehicle has been detected. If that sensor is associated with the driver of the motor vehicle, a danger warning may be issued or the mobile device may be disabled and not allowed to operate. If the sensor detected is located elsewhere in the motor vehicle indicating that it is a passenger other than the driver using the device, the device may be allowed to operate.

As also shown in FIG. 5, the proximity sensor may include, for example, a communication interface between the sensor and the device control unit (102/300). Without limitation, that communication interface may be implemented, for example, as a Bluetooth Low Energy (BLE) communication link between the proximity sensor and the device control unit (102). BLE is a low-power version of Bluetooth that was designed for the Internet of Things (IoT). BLE may have a range up to about 200 feet dependent upon the capabilities of a particular device. BLE operates with about a four-year battery life of a coin size battery cell. Classic Bluetooth, Wi-Fi or other suitable radio technology may also be used for the communication links (506) of FIG. 5. As described above in FIG. 2, the device control unit (102) may also be connected to the motor vehicle telematics unit as indicated at (507) of FIG. 5.

Figure 6:
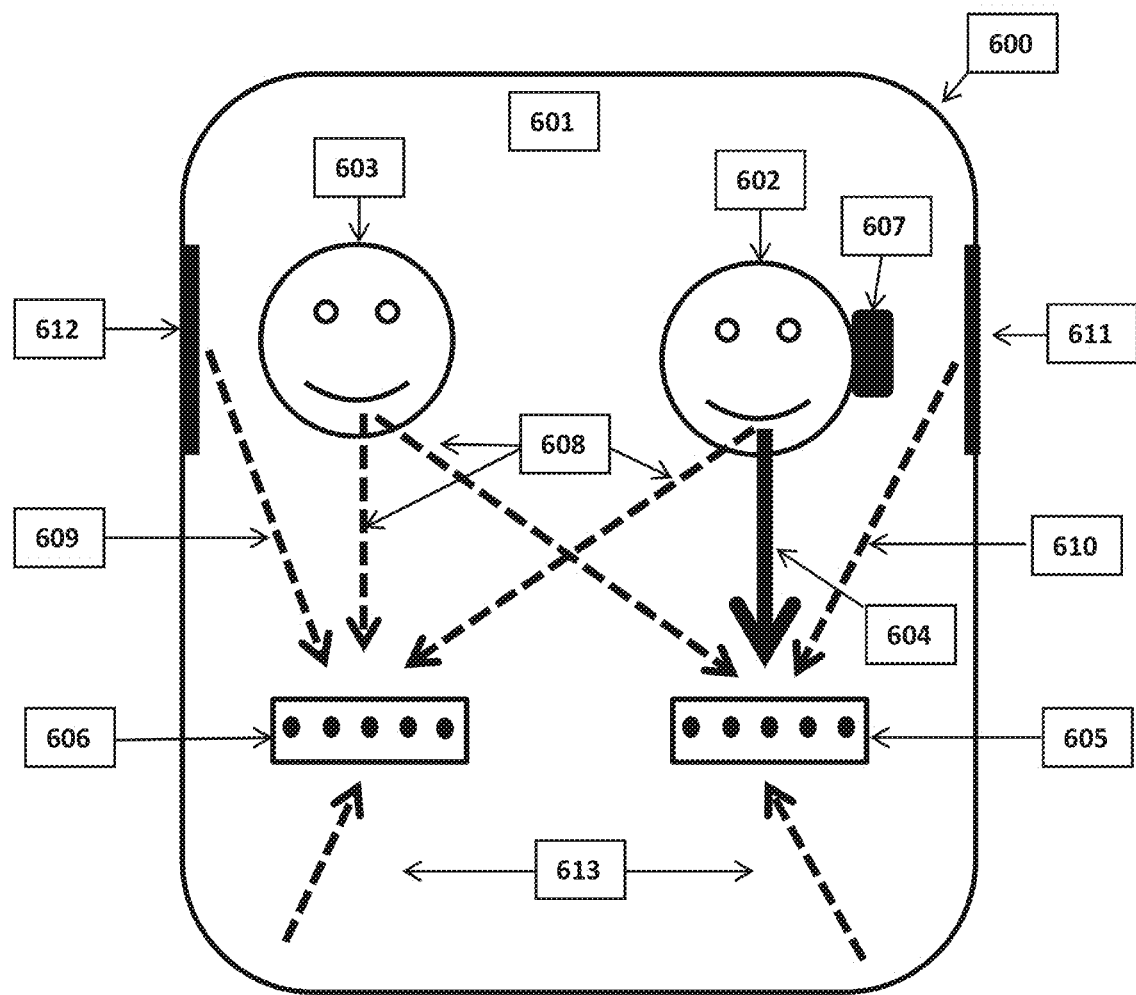
FIG. 6 depicts, without limitation, acoustic beamforming array microphones useful to isolate and detect audio speech from the driver of a moving vehicle.

FIG. 6 illustrates in area (601) without limitation, the use of directional beamforming microphone array technology (605) and optional array (606) to isolate audio signals from the driver (602) to the exclusion of other sources of noise and interference present in the motor vehicle. A directional beamforming microphone array such as array (605) is designed and configured to be more sensitive to audio sound waves arriving at the array from particular directions and less sensitive to audio sound waves arriving from other directions. In other words, the directional beamforming microphone array (605) is most sensitive to audio waveforms arriving in front of the array and contained primarily within a defined conical area depending on the number of microphone sensors in the array, their geometric configuration, and array signal processing algorithms implemented in the device control unit (102/300) of FIG. 1 shown more completely in FIG. 3 and discussed in the above paragraphs.

In addition to the microphone array and associated signal processing algorithms using beamforming to eliminate, reduce or minimize interference and noise from other sources in the motor vehicle (600), such signal processing algorithms may also be designed to eliminate such background noise and interference using additional time domain and/or frequency domain audio signal analysis to further separate audio waveforms from the driver (602) and other sources of background noise and interference. Techniques for achieving such isolation of the desired audio signals from undesired background noise interference are described, for example, in publications cited above and incorporated herein by reference including: (1) M. Brandstein and D. Ward, "Microphone Arrays," Springer, Berlin, Germany and New York, 2001; (2) J. Benesty, et. al., "Microphone Array Signal Processing," Springer, Berlin, Germany and New York, 2008.

Multiple sources of potential background noise and interference are illustrated in FIG. 6 including, without limitation, wind noise from the windows (611) and (612) of vehicle (600) indicated in the figure by sound waves (609) and (610). Additional sources of background noise and interference (613) includes noise generated by the motor vehicle (600) itself including road noise, engine noise, entertainment system noise and speaker noise (608) generated by other passengers such as passenger (603) talking while the driver (602) is using the telecommunication device or cellular telephone (607).

In some embodiments of the present invention, a single directional beamforming antenna array may be used to sufficiently isolate the audio sound waves (604) from the driver (602) speech from other background noise and interference as described above. As described above the directional beamforming antenna array (605) of FIG. 6 will operate with more gain in the direction of the speaker driver (602). However, it is also true that sound ways from other sources including, for example, sound waves from a speaking passenger (603) will be received at the directional beamforming antenna array (605), albeit with reduced sensitivity. In one embodiment of this invention, apparatus and methods are disclosed that permit comparison of speech signals from the driver (602) to those emanating from an exemplary passenger (603). Such comparisons may further enhance separation of these two or more signals and further confirm that the speech signal being received at the directional beamforming antenna array (605) is indeed audio signals from the driver (602) of the motor vehicle (600). Such further isolation of the driver (602) speech signals from those of other passengers will ensure that only the use of a telecommunications device or the cellular telephone (607) by the driver is used for artificial intelligence expert systems decision making as described further below while still allowing conversations and speech signals from other passengers. This approach may be used to permit other passengers to use their telecommunication devices or cellular telephones.

In some embodiments of the present invention, the directional beamforming antenna array (605) may be capable of scanning the area of interest using this digital signal processing to focus the beam of the array antenna in different directions. For example, in some embodiments of the present invention, it may be desirable to obtain improved voice signal quality from a passenger such as passenger (603) for the purpose of comparing those speech signals to those speech signals emanating from the driver (602) of the vehicle. Such beam scanning is known in the art and described in the above references.

As an alternative, and some in embodiments, additional directional beamforming antenna arrays such as array (606) may be used to more accurately capture signals emanating from sources other than the driver (602). These additional signals from the supplementary directional beamforming antenna array (606) may be used in the signal comparison operations described above.

Figure 7:
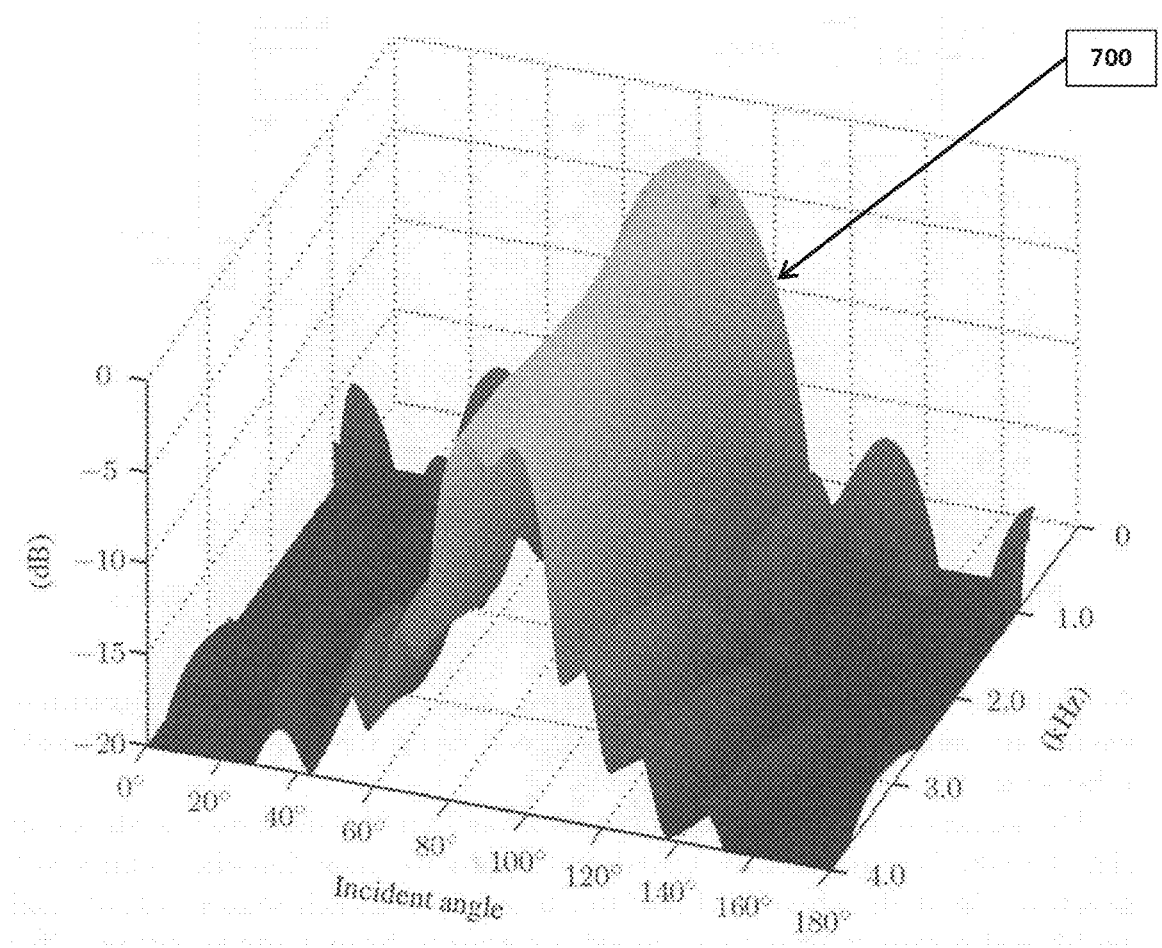
FIG. 7 depicts, without limitation, a representative frequency response of an acoustic beamforming array microphone as a function of the angle of an impinging acoustic waveform.

FIG. 7 provides an exemplary illustration (700) of the performance of one configuration of a directional beamforming antenna array. See J. Benesty, et. al., "Microphone Array Signal Processing, Springer, 2008, page 58. As can be seen from the figure, in this example, attenuation of signals arriving from outside the main lobe of the directional antenna is considerably greater than that of signals arriving within that main lobe or conical area covered by the directional beamforming antenna array and its associated signal processing algorithms. Indeed, the design of this particular antenna array has uniform response characteristics across the voice frequency band of interest from 0 to 4 kHz. As explained in the above cited reference this exemplary antenna array response is for a least-squares (LS) broadband beam former with 10 equally linearly spaced sensors 4 cm apart. Other implementations of directional beamforming antenna arrays may also be used in the present invention including implementations that attenuate selected frequency bands more than other frequency bands within the analyzed signal spectrum.

Figure 8:
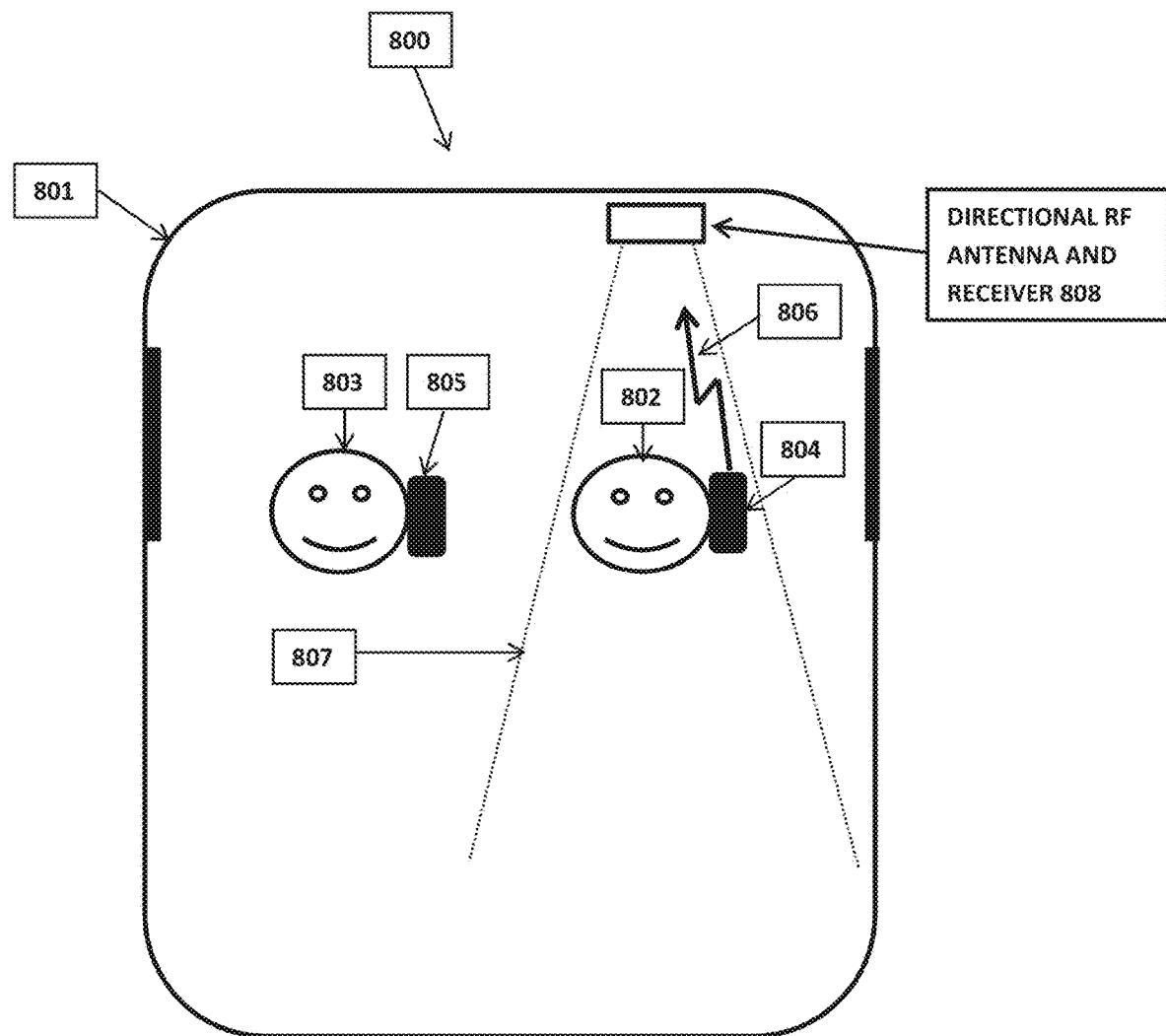
FIG. 8 depicts, without limitation, a directional RF (radio frequency) antenna useful in monitoring the use of a telecommunication device by the driver of a motor vehicle.

FIG. 8 illustrates an embodiment of this invention (800) that makes use of a directional RF (radiofrequency) antenna (808) mounted in motor vehicle (801). The directional RF antenna is designed with radiation beam coverage (807) limited to the area around the driver (802). In this way the directional RF antenna (808) will be primarily responsive to signals within the radiation beam pattern coverage (807) and less sensitivity to radio signals emanating from other telecommunication devices or cellular telephones such as (805). The detection of a radio signal from a telecommunications device or cellular telephone (804) by the directional RF antenna (808) will be a further indication verifying that the driver (802) of the vehicle is indeed using that communications device. In the depiction of FIG. 8, the directional RF antenna (808) is mounted above and behind the motor vehicle driver (802) to more specifically isolate radiation pattern coverage to the area around the motor vehicle driver (802). This mounting of the directional RF antenna (808) advantageously minimizes reception from signals emanating from behind the driver or to the side of the driver. Of course, other mounting configurations are possible.

Figure 9:
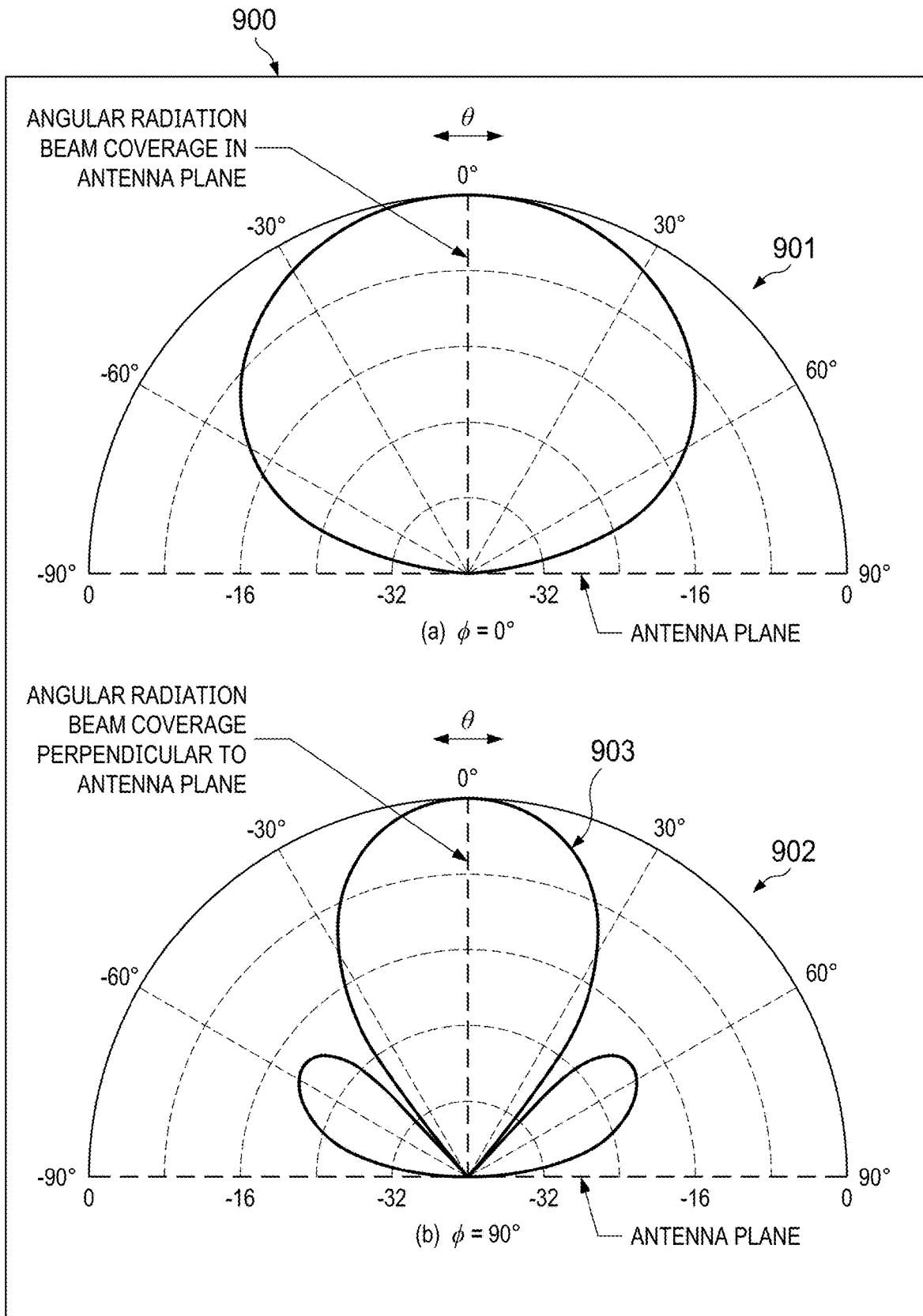
FIG. 9 depicts, without limitation, typical directional RF antenna area coverage patterns as a function of angular displacement of the antenna.

FIG. 9 illustrates exemplary radiation beam coverage patterns (900) typical of such patterns for directional RF antennas. Pattern (901) corresponds to coverage in the plane of the antenna at 0°. Pattern (903) corresponds to beam coverage perpendicular to the plane of the antenna. As can be seen in pattern (903) considerable attenuation is achieved outside of a 60° cone as indicated by the circular coverage scale (902).

Figure 10:
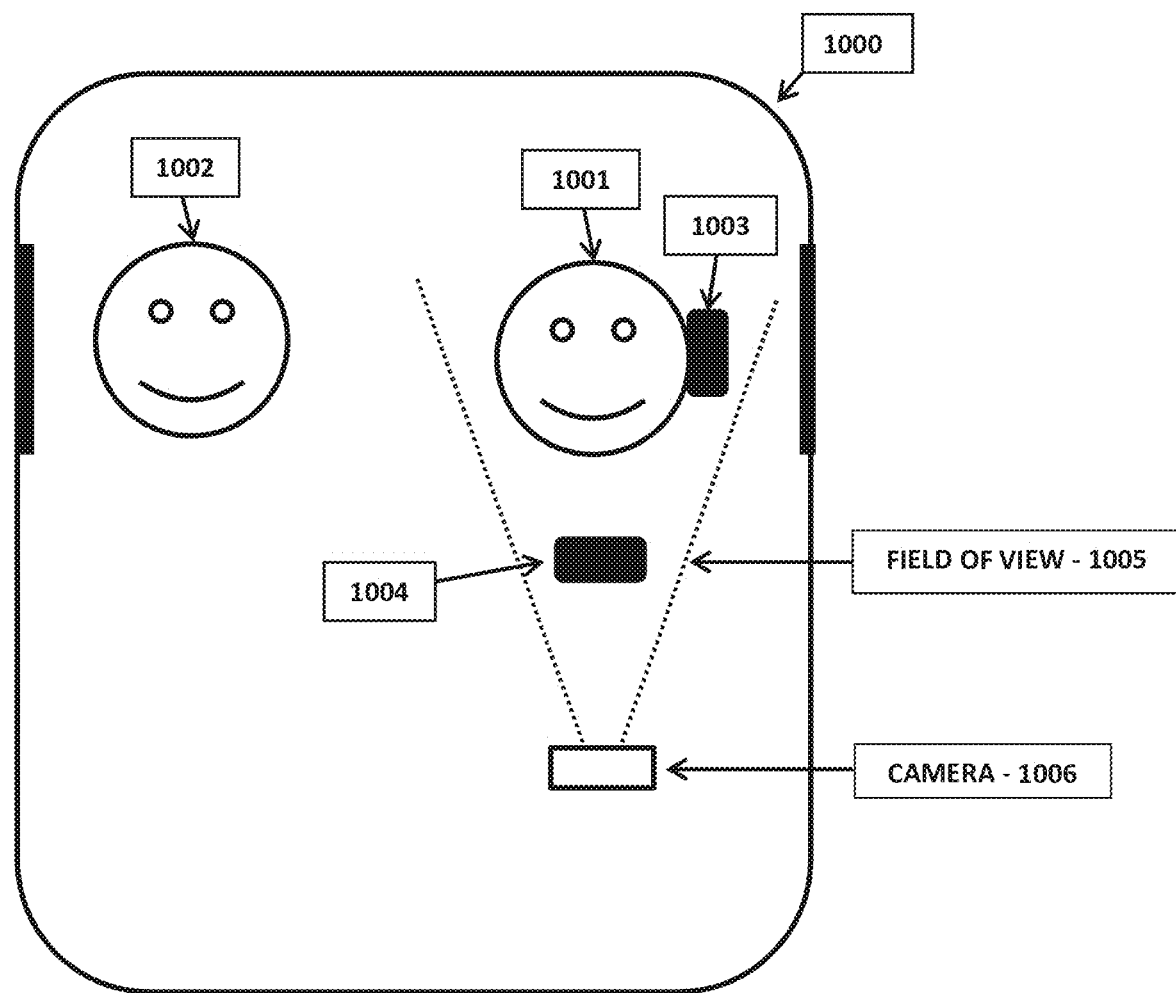
FIG. 10 depicts, without limitation, a camera to capture an image of a moving vehicle driver useful in determining the use of a telecommunication device by the driver.

FIG. 10 illustrates the use of a camera (1006) mounted in the motor vehicle (1000) useful in the present invention for capturing images of the vehicle driver (1001) to further verify the drivers use of a telecommunications device or cellular telephone (1003) or (1004) while the motor vehicle is in motion. Image analysis software implemented in the device control unit (102/300) of FIGS. 1 and 3 may be used to analyze images of the driver to verify that the driver is holding the telecommunications device or cellular telephone (1003) to his ear as illustrated in FIG. 10. In addition to the appearance of a telecommunications device or cellular telephone (1003) in the image captured by the camera, the image most probably will also include the driver's (1001) arm and hand holding the device (1003). Image analysis software used to analyze human motions such as found in video games may be used to detect movement of the driver's arm holding a cell phone and raising that cell phone to his ear for use. Image analysis software may also be used, for example, to detect driver drowsiness or sleeping by monitoring the drivers opening or closing of eyes or position of the driver in his or her vehicle seat.

In some embodiments of this invention, owners of a particular vehicle may want to register electronic images of themselves as principal drivers in the vehicle. Such images may be captured, for example, as "selfies" or as other digital images that are captured and stored in the device control unit memories. Comparison of these captured images with images of the actual driver will enable a device control unit to determine the presence of an unauthorized driver or at least a driver not recorded in the device control unit image history files. Such a finding may be used to transmit an alert to the vehicle owner indicating that a driver has been detected that is unknown to the driver control unit. Such transmission may occur, for example, via cellular telephone or Internet communications. In some embodiments, responses from the owner may be required to verify that the person driving the vehicle has been authorized by the owner in spite of the fact that the image of the driver is not in the device control unit database. If no such confirmation is received particular alerts may be transmitted to authorities to be aware of the unauthorized driver. Such information may also be used in the artificial intelligence expert system expert system warning and control system as described below.

In some cases, when the driver (1001) is using the telecommunication device or cellular telephone for texting, the actual device may be positioned at the location indicated for device (1004) shown in FIG. 10. In some cases, the combination of the audio signals received from the directional beamforming antenna array discussed above together with the image captured by the camera may be conclusive evidence that the driver (1001) is indeed talking over these telecommunications device or cellular telephone (1003) in which case the device control unit 102 of FIGS. 1, 2 and 3 may issue warnings or commands to inhibit such use depending on other driving conditions. In some embodiments of this invention it may be useful to limit the field of view (1005) of the camera (1006) as illustrated in FIG. 10 to exclude extraneous image elements such as passenger (1002) that may complicate the image analysis software.

System and Methods Operational Description

Figure 11A:
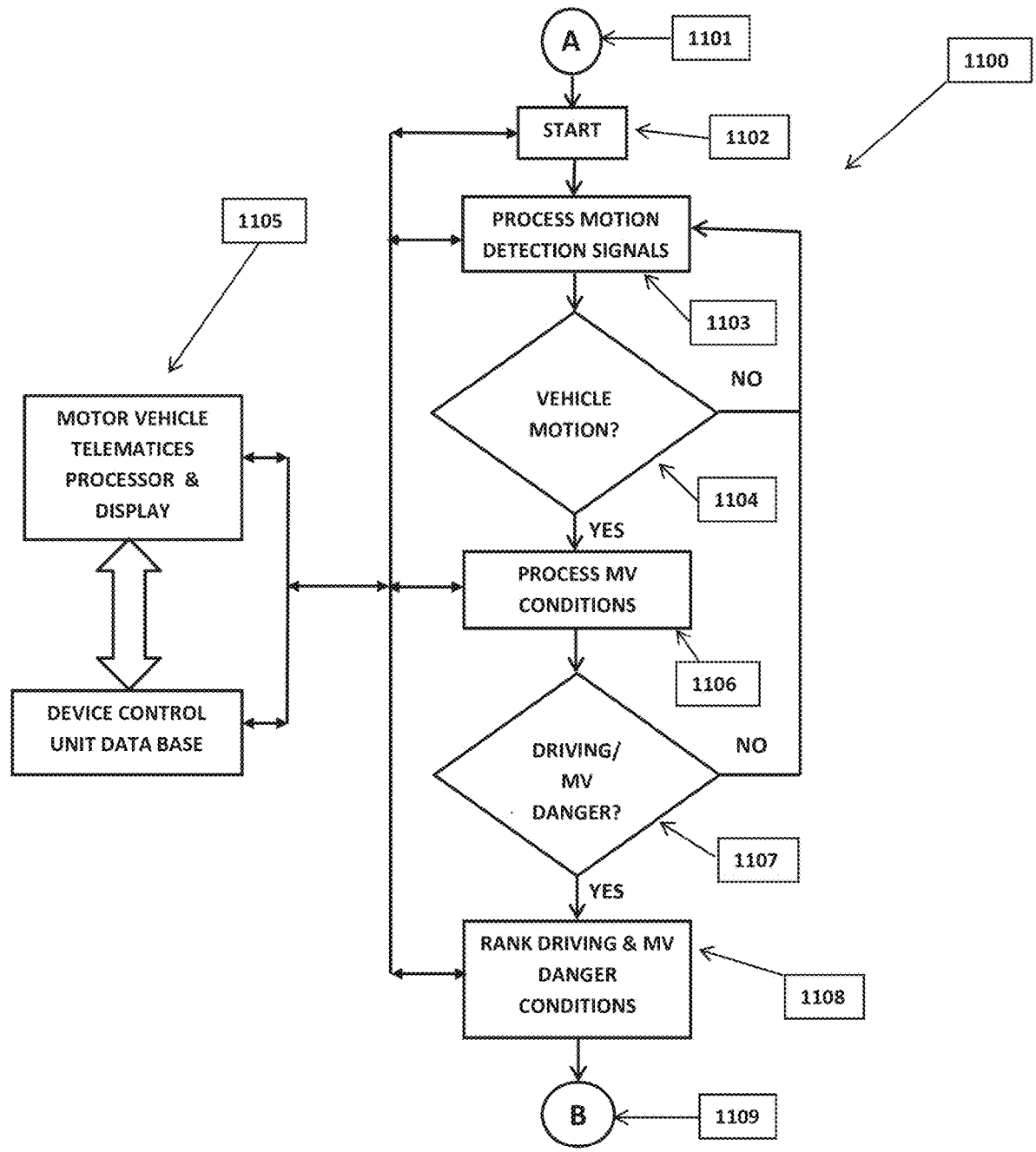
FIG. 11A depicts, without limitation, a partial flowchart for the operations of this invention.
Figure 11B:
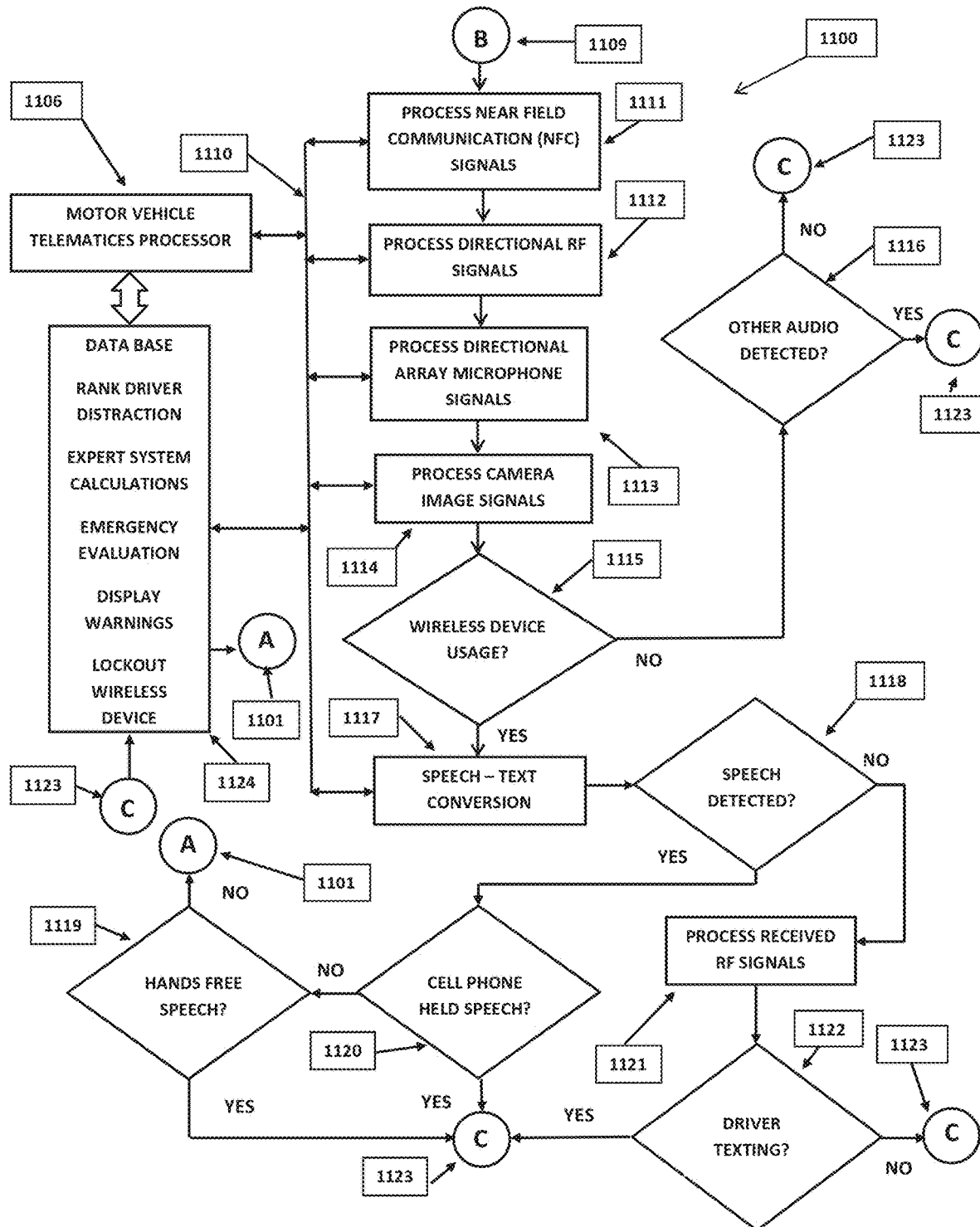
FIG. 11B depicts, without limitation, a partial flowchart for additional operations of this invention continuing from FIG. 11A of this invention.

FIGS. 11A and 11B depict, without limitation, an exemplary flowchart (1100) for operation of the system and methods of the present invention. As shown in FIG. 11A the flowchart begins at connector "A" (1101). Program initiation occurs at the start block (1102) and includes initiation of the various capabilities of the device control unit (102/300) of FIGS. 1, 2 and 3 including the various capabilities illustrated in FIG. 3 and discussed above with proper initiation of internal software/hardware registers and other data necessary for system operation. As indicated in FIG. 11A processing operations are carried out in communication with the motor vehicle telematics processor and display and the device control unit (102/300) including access to database entries of the telematics processor and device control unit (1105). Initiation through connector "A" may occur, for example, when the motor vehicle engine is started. Initiation may also occur based on vehicle motion or other parameters accessed from telematics processor and/or device control unit (1105) indicating potentially dangerous situations or based on other driver or externally generated control signals such as signals from a remote-control center as indicated, for example, in FIG. 2.

Once initiated, control is passed to block (1103) for processing of motion detection signals. Readings of motor vehicle speed from the telematics processor and/or device control unit (1105) may be used. Such readings may be based, for example, on vehicle velocity signals used to drive the vehicle speedometer. In addition, as discussed above, indications of vehicle motion including vehicle velocity and acceleration can be determined, for example, using GPS location information derived from signals received by GPS receiver (307) of FIG. 3. The GPS signals may be used in combination with time/clock signals (316) as also illustrated in FIG. 3. For example, knowing the elapsed time between successive vehicle location points as determined by signals from the GPS receiver (307) may permit calculation of average vehicle velocity between those points. As also discussed above, accelerometer (317) of FIG. 3 may be used to measure acceleration of the motor vehicle including dangerous or abnormal acceleration. Such information may form a further basis for the issuance of driver warning signals from the device control unit of FIG. 3.

External cameras, radar, and/or lidar (light detection and ranging) sensors mounted on the motor vehicle may also be used to detect dangerous driving conditions including situations when the motor vehicle is following vehicles in front of it too closely, vehicles behind the motor vehicle are following too closely, or motor vehicles being present in the "blind spot" on the drivers or passenger side of a moving motor vehicle. Detection of such dangerous driving situations may generate driver warnings and be used as input to the artificial intelligence expert system analysis systems and methods of this invention.

Control is then passed to the vehicle motion decision block (1104) as shown in FIG. 11A. If no vehicle motion has been detected, control is returned via the indicated control path to continue processing of motion detection signals in block (1103) of FIG. 11. This ensures that if the motor vehicle is not moving, all telecommunication devices and cellular phones that may be present in the motor vehicle may be used by the vehicle driver or other passengers in the vehicle. If it is determined in the vehicle motion decision block (1104) that indeed the vehicle is moving, control is passed to processing block (1106) to further evaluate driving conditions. Block (1106) evaluates detected vehicle motion including vehicle velocity or speed and erratic driving patterns including dangerous swerving, excessive lane changing, abnormal acceleration, driver driving history, and the like. Road conditions for the route of travel may also be evaluated at this point including parameters reflecting traffic and/or pedestrian congestion, accidents, weather conditions, road conditions including such considerations as surface problems, roadway width, number of lanes, erratic drivers found in proximity to the vehicle of interest, and the like. Motor vehicle operational parameters such as tire pressure, engine heat, brake conditions, oil pressure, fuel levels, vehicle age, vehicle safety inspection check and sticker status, vehicle registration status, and/or other such motor vehicle safety parameter information may also be evaluated in block (1106) of FIG. 11A. Selected information for evaluation in block (1106) may be obtained from the vehicle sensors as indicated in FIGS. 2 and 3 and/or from the motor vehicle telematics processor and data base storage unit (1105) of FIG. 11A.

As further shown in FIG. 11A, decision element (1107) makes use of the results from the evaluation of the driving and motor vehicle conditions at (1106) to decide whether or not a dangerous driving situation that needs addressing is present. If no such dangerous situation exists, control is returned via the indicated path to continue processing of motion detection signals at processing block (1103). For example, it may be the case of the motor vehicle is moving at a relatively slow speed in a perfectly safe driving environment such as a very straight well-maintained road way with little or no traffic congestion or other eminent danger to the motor vehicle and its passengers. It may also be the case that the motor vehicle is traveling at moderate speeds and the driving conditions and history of the driving habits of the driver did not warrant any alarm that there is a dangerous situation. On the other hand, if the danger decision element (1107) determines that a potentially dangerous situation may exist, control is passed to processing block (1108) to further rank driving conditions as determined from the previous processing steps of FIG. 11A. In this way, the device control unit may more accurately respond to situations that are potentially more dangerous than others.

In addition to evaluating and taking into consideration motion of the motor vehicle, the processing block (1108) may also make use of artificial intelligence expert systems (312) of FIG. 3 to include consideration of dangerous driving situations arising from traffic and or pedestrian congestion, weather conditions, and road way situations including dangerous roadways being traveled and emergency traffic situations as discussed above. More detailed discussion of such artificial intelligence expert system technology that may be used in the systems and methods of the present invention are provided below including the use of fuzzy logic decision-making (313) which may be included in the implementation of the device control unit (300) as indicated in FIG. 3.

Having performed such ranking of dangerous driving conditions, control is passed via connector "B" (1109) to the further processing and control steps of FIG. 11B. FIG. 11B is a continuation from FIG. 11A via connector "B" (1109). Having determined that a dangerous situation may exist based on the motor vehicle motions and driving conditions, the next step is to determine whether or not a telecommunications device or cellular telephone is being used in the motor vehicle or other potentially dangerous distractions for the driver exist. As indicated in FIG. 11B, multiple sensors including, for example, near field communication (NFC) signal sensors (1111), directional RF signal sensors (1112), directional array microphone sensors (1113) and camera image sensors (1114) may be used alone and/or in combination with other sensors to determine whether or not the driver of the motor vehicle is using a wireless device such as a cellular telephone or is otherwise distracted from proper operation of the motor vehicle. These various sensors are connected via software and electrical and/or optical pathways (1110) to motor vehicle telematics processor display and database storage unit (1106) and/or the device control unit designated as (1124). These connections enable further processing and storage of sensor information as well as displaying particular parameters of concern or importance to the driver via display units of the telematics processor.

As discussed above and illustrated in FIGS. 3, 4 and 5, near field communication (NFC) sensors (1111) may be used to detect the presence of NFC signals and determine the location of emanation of those signals within a motor vehicle. As shown in FIG. 11B, at block (1111) that detection is used with the other sensors described as above to determine whether or not the driver of the motor vehicle is using a wireless device such as a cellular telephone.

Directional RF signals from the area occupied by the driver of the motor vehicle are detected in block (1112). This determination may be made using the directional RF antenna and receiver (808) of FIG. 8. As illustrated in FIG. 8, the directional antenna and receiver (808) is most sensitive in a restricted beam area (807) that primarily covers the area surrounding the driver (802) of the motor vehicle. Signals from telecommunications device or cellular telephone (805) being used by passenger (803) are outside the primary lobe or coverage area of the directional antenna and receiver (808). Signals (806) from the telecommunications device or cellular telephone (804) being used by the motor vehicle driver (802) will be received as stronger signals compared to others that are outside of the main coverage area lobe as illustrated in FIG. 8. In addition, the directional antenna and receiver (808) may be mounted to the rear of driver (802) to minimize picking up RF signals from other telecommunication devices or cellular telephones that may be located in the rear of the motor vehicle, for example, being used by passengers in rear seats of that vehicle. Threshold levels for the RF signals may be set to facilitate distinguishing stronger signals from the driver (802) from those that might be emanated from cell phones used by passengers such as cell phone (805) from passenger (803) of FIG. 8. Dynamic adjustment of such threshold levels may be made based on "learning algorithms" implemented in the RF receiver (808) and/or device control unit (102/300). Such "learning algorithms" may be integrated with other sensors to assist in setting threshold levels when those other sensors also indicate that the driver is using his or her cellular telephone or other wireless device.

In the United States two different cellular telephone modulation standards have emerged and are in use—GSM and CDMA. Both GSM and CDMA operate in the UHF (Ultra-High Frequency) bands. GSM (Global System for Mobile communications) makes use of frequency division multiplexing with 8 or 16 timeslots defined and shared by multiple calls on each of the frequencies. GSM is widely adopted throughout the world. The GSM Association estimated that in 2010 the GSM standard served 80% of the global mobile market or more than 5 billion people in more than 212 countries making it by far the most widely used mobile communication network standard.

CDMA (Code Division Multiple Access) makes use of a different modulation technique than GSM. CDMA is based on spread spectrum technology with digital signals for individual calls occupying the same frequency ranges and being separable based on unique digital coding for individual called channels. In the United States CDMA operates in the 800-MHz and 1900-MHz frequency bands.

Regardless of whether GSM or CDMA technology is used, the directional antenna and receiver (808) need only detect the presence of an RF signal in the respective frequency ranges to verify the operation of a telecommunications device or cellular telephone being used by the driver of the motor vehicle as illustrated in FIG. 8. Multiple techniques for implementing such a receiver are known to those of skill in the art of radio receiver design. Simpler designs that only detect the presence of such RF signals may be used, or more complete GSM and CDMA receiver such as used in cellular telephones and capable of the demodulating individual channels may also be used.

Block (1113) processes directional array microphone signals as illustrated for example in FIG. 6 and explained above relative to that figure. A directional microphone array (605) may use acoustic beamforming and other noise reduction algorithms as explained above to isolate speech from the driver of the vehicle and those of other passengers, wind noise, road noise, motor vehicle engine noise or other interfering acoustic signals.

Block (1114) provides for processing of captured camera image signals as illustrated in FIG. 10 and discussed above. Such image analysis may provide useful information concerning activities of the driver and in particular the driver's use of cellular telephones or other wireless devices for communication purposes.

Based on the results of the above described sensor analysis, control is passed to decision element (1115) to direct further activities depending on the results of that analysis. Such analysis may be based on outputs from the collection of sensor analysis blocks (1111), (1112), (1113) and (1114) to provide evidence of dangerous driver distractions arising from the use of cellular telephones or other wireless devices. The outputs from some of the above sensors may be inconclusive while others may give a positive indication of driver use of these telecommunication devices. Certainly, if all sensors indicate such use, a decision is made confirming that use. Other combinations of results may be evaluated with decisions made based on individual sensor outputs and the combination of those outputs. For example, the output of the directional RF signal detection may be inconclusive but the near field communication sensors signals and microphone array signals may indeed indicate that the driver is involved in the use of cellular telephones or other wireless devices. The application of artificial intelligence expert system technology and fuzzy logic to further assist in evaluating dangerous driver distractions in combination with other dangerous driving conditions is discussed further below.

If no driver telecommunication device or cellular telephone signals are detected, control is passed to decision element (1116) for determination of whether or not other cognitive distractions in the form of audio signals from passenger conversations or other sources are present. Such additional audio cognitive distractions may be detected, for example, using omnidirectional antenna and associated receiver (324) of FIG. 3 and/or results from signals received by the directional microphone arrays (303) of FIG. 3 and further illustrated as directional microphone arrays (605) and (606) of FIG. 6. If such additional cognitive distractions are detected control is passed via connector "C" (1123) for issuance of appropriate warnings and/or file history entries.

Even if no other cognitive disruptive audio is detected at decision element (1116), control is still passed to connector "C" of FIG. 11B as described above with notification that no telecommunication device or cellular telephone is being used and no other cognitive distractions have been detected. However, based on other dangerous driving conditions detected as indicated in FIG. 11A and discussed above, warning signals may still be issued to the driver.

If the wireless device usage decision element (1115) indicates that the device control unit (300) has determined that a dangerous driving situation exists and based on the sensor analysis (1111), (1112), (1113) and/or (1114) that positive sensor results indicate a driver is using his or her wireless device while driving in a dangerous situation, control may next be passed to the speech-to-text conversion block (1117) of FIG. 11B. Using speech-to-text conversion with accompanying recognition of selected words or phrases will provide further indication that the driver of the moving motor vehicle is talking on a telecommunication device or cellular telephone as opposed to texting or using the cellular telephone or wireless device in some other manner. Control is next passed to speech detection decision block (1118). Based on the above described sensor and speech to text conversion analysis a decision is made as to whether or not actual driver speech has been detected. If no speech has been detected, but indication exists from the above described sensor and signal analysis that the driver is using a wireless device or cell phone and driving in a dangerous situation, control is passed to further process the received RF signals at block (1121).

The decision as to whether or not the driver may be texting on his or her wireless device or cellular telephone is made in decision element (1122). Such determination can be made based on analysis of the RF signal with demodulation of the any actual data signals. If no signals corresponding to actual text transmissions can be detected, and control is passed to connector "C" (1123) for registering final decisions at information block (1124) as indicated in FIG. 11B. At this point the actual testing has been indeterminate in ascertaining whether or not the driver is talking or texting using a wireless device or cell phone while driving in a dangerous situation. Nonetheless, at least dangerous driving conditions have been detected and appropriate warnings to the driver may be displayed at block (1124). Control is then passed via connector A (1101) to resume monitoring for dangerous driving situations as depicted in FIG. 11A. If the texting decision element (1122) concludes of the driver is indeed texting, control is passed via connector "C" (1123) to reflect the situation in the accumulated information and to permit ranking of driver distraction caused by such texting using artificial intelligence expert system analysis as described below. Based on the results of this analysis, appropriate warnings may be displayed by unit (1124) of FIG. 11B.

On the other hand, if decision element (1118) determines that actual speech has been detected, control is then passed to decision element (1120) to determine whether or not the detected speech has resulted from a cellular telephone or other wireless device being held to the user's ear for the purpose of communication while driving in a dangerous situation. This decision may be made, for example, based on the results of near field communication sensors analysis (1111) and/or of the camera image signals at block (1114). If the answer to this question is "yes," control is passed to connector "C" (1123). Connector C passes control to the rank driver distraction block (1124) discussed below as shown in FIG. 11B.

If it is determined at hand held decision element (1120) that the cellular telephone or wireless communication device is not being held by the user, the control is passed to the hands-free speech decision element (1119). The hands-free speech detection decision (1119) may also access the motor vehicle telematics processor for an indication that a hands-free telecommunications call is indeed in progress. Based on that information and the information from the above described NFC sensors (1111), directional RF signal sensors (1112), directional array microphone signal sensors (1113) and/or camera image signal sensors (1114) it can be determined whether or not the hands-free communication call involves the driver of the motor vehicle. If it is determined that the cell phone or other wireless communication device is being used in a hands-free mode, control is passed to connector "C" (1123). Connector C passes control to the rank driver distraction block (1124) discussed below as shown in FIG. 11B.

The ranking of driver distraction and dangerous driving conditions in block (1124) then provides an indication based on the motor vehicle motion, motor vehicle conditions, roadway conditions, traffic and/or pedestrian congestion, emergency reporting situations, driving distractions including those arising from the use of cellular telephones or wireless devices as described above, or other driving distractions caused by other activities in a moving vehicle. As discussed above, all of this information is available in the motor vehicle database for evaluation of the overall degree of danger and for determination of appropriate warnings and/or control signals. This evaluation and ranking of a dangerous situation may be carried out using artificial intelligence expert system methods as described below. Such artificial intelligence may include the use of fuzzy logic reasoning as also described below.

An appropriate warning signal may be displayed or action may be taken to terminate the communication from the wireless device being used by the driver of the motor vehicle. Information recording driver violation of safe driving practices may be recorded in a history file in the database of device control unit (1124) shown in FIG. 11B. For example, the warning signals or commands may be issued via speaker (318) or by messages displayed on display unit (320) of FIG. 3 or by other emergency warning implementations designed to be certain the driver and passengers in the motor vehicle are aware of the danger and appropriate corrections to ensure their safety are made.

In one embodiment of the present invention, the device control unit (102/300) of FIGS. 1, 2 and 3 may issue a command to the telecommunications device or cellular telephone to inhibit its operation. Such commands may be transmitted, for example, via cellular transceiver (308), data transceiver (309), Bluetooth transceiver (310) or Wi-Fi transceiver (311) of FIG. 3 used as discussed above and configured to transmit such control commands to the telecommunications device or cellular telephone being used by the driver of the motor vehicle. One technology useful in transmitting such messages are SMS control messages that may be "pushed" to the telecommunications device or cellular telephone without first being requested by that device or telephone and which may be used with application software to inhibit the use of the telecommunications device or cellular telephone that is being used in a dangerous manner by the driver of the moving vehicle.

As indicated in FIG. 11B and discussed above, wireless decision usage element (1115) depends upon the outputs from the four exemplary passenger activity sensors (1111), (1112), (1113) and (1114). These four exemplary sensors may include near field communication (NFC) sensors, directional RF signals, the directional array microphone signals and camera image signals. Based on the outputs of the sensors, the wireless device usage decision element (1115) decides whether or not evidence from the sensors indicates with some degree of certainty that the driver of the vehicle is involved in dangerous usage of a cellular telephone or wireless device. If such usage is confirmed, control is passed to elements (1117) through (1124) for further signal analysis. In general, no one of the sensors by themselves may be considered to confirm dangerous usage by the driver of a cellular telephone or wireless device. For example, false alarms are possible. The near field communication signal (NFC) sensor may be responsive to a device not being used by the driver. The RF signal sensor may be responsive to a signal not emanating from a device being used by the driver. The microphone array signal sensors may be responsive to speech or audio signals not being generated by the driver of the motor vehicle. And the camera image signal analysis may respond to images that did not necessarily correspond to cellular telephone or wireless device usage by the driver of the motor vehicle. These issues of determining with an appropriate level of certainty that the driver of the motor vehicle is involved in dangerous usage of cellular telephones or wireless devices is further complicated by the presence of other passengers in the motor vehicle who may be using such devices or otherwise generating signals to which the above-described sensors may be responsive.

Without limitation, FIG. 12 presents an expert sensor decision matrix (1200) of the type that may be used by wireless device usage decision element (1115) of FIG. 11B. This matrix (1200) sets forth possible cell phone-wireless device usage sensor decisions for each of the 16 possible combinations of results from the above for identified driver activity sensors (1111), (1112), (1113) and (1114) as discussed above. In this matrix, a "0" indicates a negative result from the sensor and an "X" indicates a positive result. The decision matrix of FIG. 12 requires that three of the four sensors indicate positive results for dangerous driver activity involving the use of a cellular telephone or other wireless device. As shown in FIG. 12, 5 of the 16 possible combinations of sensor results indicate dangerous usage of a cellular telephone or wireless device by the driver of the motor vehicle. Of course, it is possible that other expert decision criteria may be used to make the final decision in the wireless device usage decision element (1115) of FIG. 11B without departing from the teachings and scope of the present invention. For example, fewer than three out of four sensor positive results may be sufficient to indicate that the driver is involved in dangerous usage of a wireless device or cellular telephone. In addition, more weight may be given to the output of some sensors than other sensors. In addition, the outputs of individual sensors may be graded or ranked based on the strength of the indication from those individual sensors. Artificial intelligence expert systems and/or fuzzy logic may be used to assist in making such decisions. The use of such artificial intelligence expert system technology may prove useful in some embodiments to be used to supplement or in place of the yes/no discrete decisions depicted in FIG. 12.

Artificial Intelligence Expert System and Methods Description

Artificial intelligence expert system technology may be used to assist in determination of appropriate warning and control signals at block (1124) of FIG. 11B. Without limitation, an exemplary artificial intelligence expert system implementation involving four critical variables in developing a comprehensive driver danger-warning index is described below. The implementation presented here is meant to be descriptive of such a comprehensive system but is not intended to limit in anyway the application of artificial intelligence expert system technologies and/or fuzzy logic to such a system. Different variables in different combinations may be defined based on the principles set forth herein and remain within the scope of the invention herein described. The variables considered here are: (1) roadway conditions, (2) weather conditions, (3) traffic conditions and (4) driver distraction. Each of these four variables depend upon multiple considerations that may also be included in implementation of this invention described herein without departing from or adding to the teachings herein presented.

Figure 13:
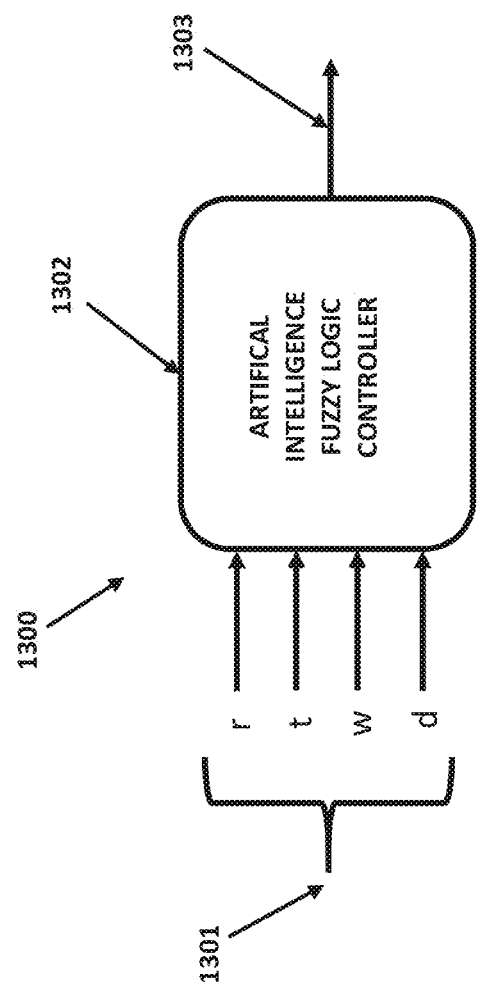
FIG. 13 depicts, without limitation, exemplary use of a general artificial intelligence fuzzy logic controller with roadway, traffic, weather and driver distraction input variables for analysis to produce output driver warning and control signals.

Without limitation, FIG. 13 depicts an artificial intelligence fuzzy logic control (1300) system for deriving driver danger warning signals useful in some embodiments of the present invention. The controller (1300) comprises an artificial intelligence fuzzy logic controller (1302) used for analyzing variable signal inputs (1301) as indicated in the figure. Those signal inputs include (1) "r" roadway conditions, (2) "w" weather conditions, (3) "t" traffic conditions and (4) "d" driver distraction signals. The input signals are processed by the controller (1302) producing output warning and control signals (1303) as described more completely below.

Figure 14:
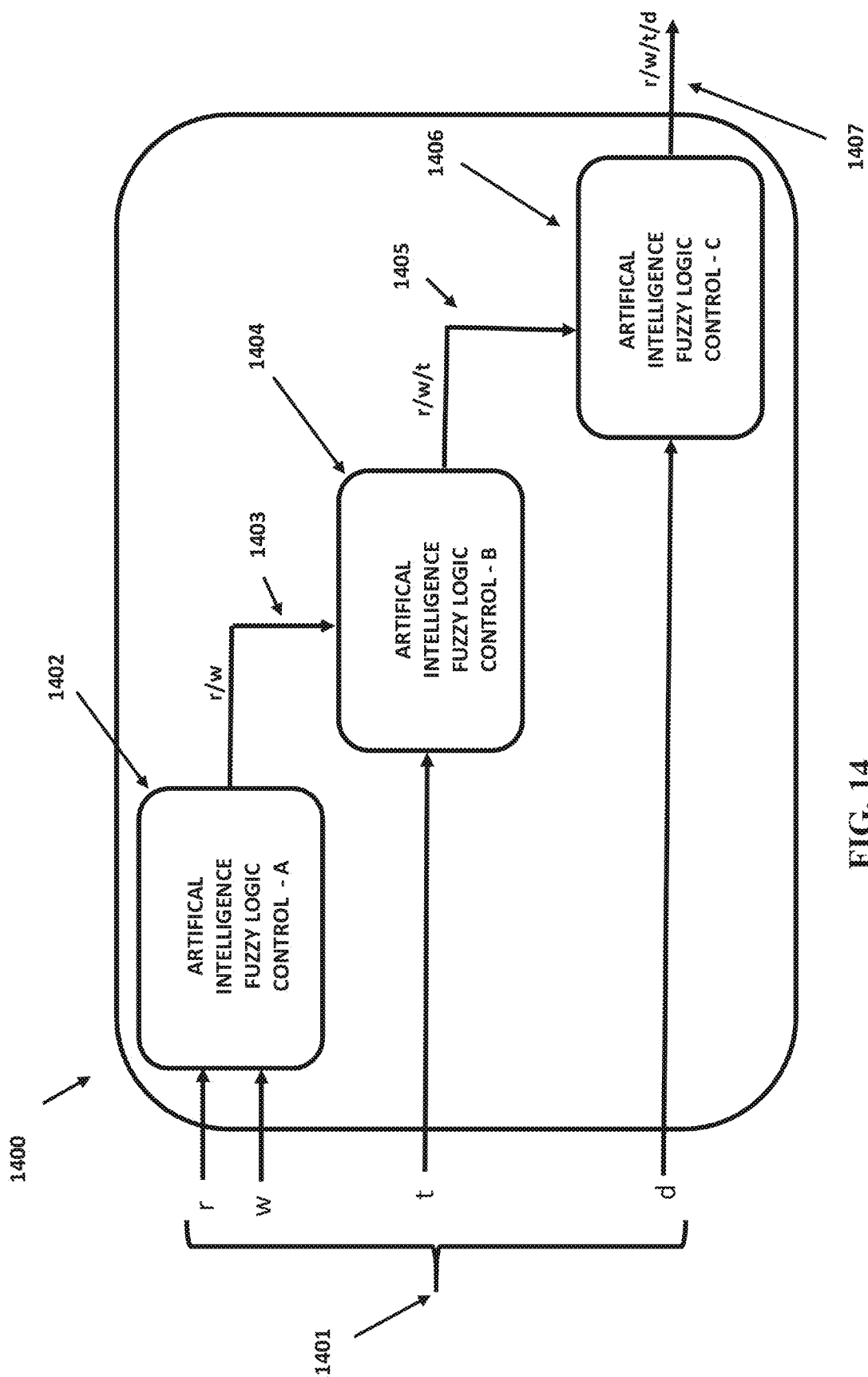
FIG. 14 depicts, without limitation, a flow chart for artificial intelligence analysis of the input variables of FIG. 13 to produce the output driver warning and control signals.

Without limitation, FIG. 14 depicts a flowchart (1400) useful in the implementation of the processing unit (1124) of FIG. 11B. The flow chart depicts possible artificial intelligence expert system processing of the four roadway condition, weather condition, traffic condition and driver distraction signals (1401) depicted in FIG. 13. Processing begins at block (1402) with input of the input roadway and weather condition sensor network data inputs. A warning index (1403) based on these inputs is computed at block (1402). Input traffic congestion data is input at block (1404). This input traffic congestion data together with the road/weather warning index computed in block (1402) is used to compute a driving warning index (1405) based on all three of the road/weather/traffic sensor network data inputs. At block (1406) input data characterizing motor vehicle driver and/or passenger activities that may represent distractions to the driver of the motor vehicle are input. This driver distraction data is used at block (1406) to compute a comprehensive driver warning index (1407) based on all four input variables—roadway conditions, weather conditions, traffic conditions and driver distractions. More detailed descriptions of exemplary artificial intelligence expert system implementation of the computations of FIG. 14 according to the present invention are presented in FIGS. 15A to 15G and discussed in detail below.

While FIG. 14 describes successive considerations of the four exemplary variables, other artificial intelligence fuzzy logic implementations embodiments may be used without departing from the teachings of the present invention. For example, embodiments that consider different combinations of variables or all of the variables in a single, multi-dimensional, fuzzy logic calculations are possible. While such alternatives are possible and within the scope of the present invention, the approach of FIG. 14 provides information in output signals reflecting where the real dangers exist and potentially better informing the driver of the nature of actual dangerous situations.

FIG. 15A presents an artificial intelligence expert system decision matrix (1500) involving the roadway condition and weather condition variables. This matrix may be used to derive a road/weather warning index based on the degree of danger to the driver and passengers of a motor vehicle arising from roadway and weather conditions. As described further below, the resulting road/weather warning index may be used with traffic and driver distraction third and fourth variables to derive an overall artificial intelligence expert systems assessment of danger to the driver and passengers of the motor vehicle.

Considering first the decision matrix (1500) depicted in FIG. 15A, the roadway condition variable may be categorized as corresponding to: (1) very low danger, (2) low danger, (3) medium danger, (4) high danger or (5) very high danger. For example, the roadway degree of danger may be determined from such considerations such as roadway surface conditions; slippery roadway, roadway construction projects; roadway width; roadway incline; roadway location including, for example, a switchback or mountainous roadway involving steep drop-offs; roadway signage; the presence or absence of roadway control signaling such as stoplights or warning lights or warning signs; the number of traffic lanes; railroad crossings; crossroads; and/or roadway accident history or other similar variables that might impact safety considerations with respect to the roadway being traveled. Considering these various variables, a roadway expert safety engineer or equivalent personnel may designate the danger parameters for the given roadway into one of the above five categories.

For example, the following roadway conditions may be defined:
roadway danger very low—very little or no roadway issues with no known issues arriving from roadway surface conditions, dangerous driving conditions, warning or signal issues, crossroads, accident history or the like,
roadway danger low—minor roadway issues and no known issues arising from accidents, high-speed chases, police activities or the like,
roadway danger medium—moderate roadway issues with at least one issue involving accidents, high-speed chases, police activities or the like,
roadway danger high—more serious roadway issues with complicating traffic issues such as accidents, high-speed chases, police activities or the like,
roadway is danger very high—bad roadway issues with very high traffic congestion levels and serious complicating traffic issues involving accidents, high-speed chases or police activities or the like.

In a similar way, FIG. 15A is based on the use of a variable describing weather conditions on the roadway being traveled. Weather conditions may include considerations such as the following: no weather issues whatsoever, temperature, rain of varying intensity, hail of varying intensity, snow of varying intensity, ice and/or snow on the roadway, high winds, tornadoes, hurricanes, blizzards and the like. Here again a roadway weather expert safety engineer or equivalent personnel may designate the danger parameter for the given conditions into one of the above five categories.

For example, the following weather conditions may be defined:
weather danger very low—very little or no roadway current or forecast weather issues or the like,
weather danger low—minor weather issues with light winds and light rain sprinkles or the like,
weather danger medium—moderate weather issues with heavier rain or light snow or the like,
weather danger high—more serious weather issues with heavy rain or hail or snow or the like,
weather danger very high—very serious weather issues with accumulating snow, ice, flooding, high winds of the like.

Based on the combination of roadway danger and weather conditions as described above, a road/weather warning index may be derived from the matrix of FIG. 15A. For example, as indicated in the figure, if the roadway poses high danger and the weather poses medium danger then the road/weather index will be "high." The proper assignment of road/weather warning indices in FIG. 15A may be provided by expert traffic engineers based on experience and safety/ accident records under the described conditions.

The 25 results for the road/weather warning index values shown in the matrix of FIG. 15A may be described in terms of propositional calculus formulations, for example, as follows:
If the road danger is very low and the weather danger is very high, then the road/weather warning index is high.
If the road danger is high and the weather danger is low, then the road/traffic warning index is high.
If the road danger is very high and the weather danger is low, then the road/traffic warning index is high.

Clearly 25 such propositional calculus statements exist for the road/weather warning index matrix (1500) of FIG. 15A. The weather and roadway danger indices of FIG. 15A are derived from external systems as indicated, for example, in FIG. 2. The parameters for the road/weather warning index matrix of FIG. 15A are transmitted via the motor vehicle communication system (204) to the motor vehicle telematics database and programs (201) and device control unit (102/

300) of FIGS. 2 and 3 for further integration into and use in the artificial intelligence expert system analysis of the present invention.

The intelligent system matrix of FIG. 15A and the associated propositional logic expressions may also be used to formulate a fuzzy logic implementation of the device control unit (102/300) of the present invention. Fuzzy logic has found expanded uses in the development of sophisticated control systems. With this technology complex requirements may be implemented in amazingly simple, easily managed and inexpensive controllers. It is a relatively simple method of representing analog processes on a digital computer. It has been successfully applied in a myriad of applications such as flight control systems, camera systems, antilock brakes systems, wash machines, elevator controllers, hot-water heaters, and stock trading programs.

In the present invention, the variable ranges for roadway danger and weather danger indicated in FIG. 15A may be "fuzzified" as fuzzy logic variables extending over the defined overlapping ranges as shown, for example, in the fuzzification diagrams 1501 of FIG. 15B. With fuzzy logic control, statements are written in the form of the propositional logic statements as illustrated above. These statements represent somewhat imprecise ideas reflecting the states of the variables. Fuzzy logic is particularly appropriate when an expert is available to specify these propositional statements characterizing the relationships between system variables.

Fuzzy logic systems make use of "fuzzifers" that convert input variables into their fuzzy representations. "Defuzzifiers" convert the output of the fuzzy logic process into "crisp" numerical values that may be used in system control.

For example, the graph (1502) of FIG. 15B illustrates such a possible "fuzzification" for the roadway danger index variable of FIG. 15A with overlapping ranges indicated in the figure. Numerical values from 0 to 10 may be assigned to the respective input roadway and weather variables depending on their classification as low, very low, medium high or very high as described above. For example, values of 1, 3, 5, 7 or 9 may be assigned to the respective classifications, as well as values between these values depending on the expert programming of the system.

In this example, based on the combination of roadway conditions derived from the sensor networks and other inputs, a roadway danger index of 5.7 has been determined. As indicated in the diagram of (1502), the fuzzy logic calculations depicted here are based on triangular degree of membership (DOM) classifications corresponding to the very low, low, medium, high and very high parameter values indicated in the matrix of FIG. 15B. Plotting the roadway danger index of 5.7 on the horizontal axis indicates a degree of membership in the medium classification of 0.67 with no membership for this variable in any of the other indicated triangular ranges. Only the "medium" membership function "fires." Even so, the DOM of 0.67 indicates a less than maximum membership in the "medium" range.

In a similar way, in the diagram of (1503), the indicated whether danger index of 7.0 results in a degree of membership (DOM) of 0.4 in the triangular high danger classification and 0.2 in the triangular medium danger classification. Both the high and medium membership functions are "fired" reflecting the "fuzzy" nature of the weather input data.

These DOM values may in turn be used in the fuzzy logic implementation to derive a defined, "crisp" numerical value for the combined roadway/weather warning index. This process is called "defuzzification." Without limitation, in one embodiment of the present invention, defuzzification may be based on a logical "or" relationship between respective DOM values for the variables to be defuzzified.

The conjunctive relation "OR" corresponds to the logical union of the two sets corresponding to the roadway danger and weather danger index variables. In this case the appropriate DOM is the maximum DOM for each of the sets at the specified time. This is expressed algebraically as follows:

$(A \cup B)(x) = \max(A(x), B(x))$ for all $x \in X$

Without limitation, in other embodiments of the present invention defuzzification may be based on a DOM logical "and" relationship. Premises connected by an "AND" relationship are combined by taking the minimum DOM for the intersection values. This is expressed algebraically as follows:

$(A \cap B)(x) = \min(A(x), B(x))$ for all $x \in X$

Consider the logical "or" relationship as described above. The union relation "OR" requires the use of the maximum value of the respective DOM's for roadway danger and weather danger. Use of the maximum DOM focuses attention on the more dangerous parameter values.

From the graphs (1502) and (1503), for these propositional logic equations the corresponding DOM's are 0.67 for the roadway danger variable medium DOM and 0.4 for the weather danger variable high DOM.

These values may be used to defuzzify low and medium ranges of the roadway and weather warning action indices degree of memberships. As shown in (1504) of FIG. 15B, fuzzy ranges for the combined roadway/weather index may be defined in a similar manner to the roadway and weather variables. A numerical "crisp" value for the combined roadway/weather warning index can now be derived using defuzzification procedures. As shown in FIG. 15B, the DOM ranges for the roadway/weather warning index are capped at values corresponding to the above analysis for the DOMs of the roadway danger and weather danger variables. Without limitation, the final "crisp" numerical value of the driver warning action index may be calculated based on the centroid of the geometric figure for the low and medium DOM ranges of the graph (1504) of FIG. 15B. For example, this calculation may be carried out by dividing the geometric figure of FIG. 1504 into sub-areas $A_i$ each with known individual centroids $x_i$ from the following formula.

$$x_c = \left(\sum_{i=1}^{n} x_i A_i\right) \bigg/ \left(\sum_{i=1}^{n} A_i\right)$$

The result of such a calculation is shown in FIG. 15B yielding a roadway/weather warning action index crisp numerical value of about 6.75. Note that this value is somewhat less than the weather index of 7 and somewhat more than the roadway index of 5.7. The value of 6.75 reflects the greater concern for weather over roadway dangers.

As described above, in some embodiments of this invention, multi-dimensional fuzzy logic calculations based on multiple input variables with a resulting multi-dimensional surface for defuzzification may also be used. In this case, more than two individual input variables may be fuzzified simultaneously in the same manner as shown in FIG. 15B and discussed above. Multiple degree of membership results may then be used to result in a multidimensional surface calculation for defuzzification and derivation of a crisp output value.

In a similar way, the artificial intelligence expert system decision matrix (1505) of FIG. 15C is constructed using a combination of the road/weather warning index derived above with a third variable indicative of danger level of traffic on the roadway being traveled. The 25 entries in the matrix (1505) of FIG. 15C set forth a composite measure of vehicle driving danger due to roadway conditions, weather and traffic. The traffic danger variable of this matrix is categorized as corresponding to: (1) very low danger, (2) low danger, (3) medium danger, (4) high danger or (5) very high danger. For example, the degree of danger arising from traffic considerations may be determined from considerations involving the volume of traffic on the road, accidents on the roadway, traffic delays, known erratic drivers on the roadway, high speed chases, police activities, pedestrian traffic density and the like. Once again, considering these various variables a traffic expert safety engineer or equivalent personnel may designate danger parameters for the giving traffic conditions into one of the above five categories.

For example, the traffic danger variable may be categorized into one of the above five degrees of danger in accordance with considerations such as those exemplified below:
  traffic danger very low—very little or no traffic with no known issues arriving from accidents, high-speed chases police activities or the like,
  traffic danger low—low traffic levels, no known issues arriving from accidents, high-speed chases, police activities or the like,
  traffic danger medium—moderate traffic levels with at least one issue involving accidents, high-speed chases, police activities or the like,
  traffic danger high—high traffic levels with complicating traffic issues such as accidents, high-speed chases, police activities or the like,
  traffic is danger very high—very high traffic congestion levels with serious complicating traffic issues involving accidents, high-speed chases or police activities or the like.

Here again, the 25 results for the road/traffic warning index values shown in the matrix of FIG. 115C may be described in terms of propositional calculus formulations, for example, as follows:
  If the traffic danger is very low and the road/weather danger is very high, then the driving warning index is high.
  If the traffic danger is high and the road/weather danger is low, then the driving warning index is medium.
  If the traffic danger is very high and the road/weather danger is low, then the driving warning index is high.

Once again, 25 such propositional calculus statements exist for the vehicle driving warning index matrix (1505) of FIG. 15C. The traffic congestion and road/weather danger indices of FIG. 15C are derived from external systems such as the roadway/traffic monitor (207) of FIG. 2. The parameters for the vehicle driving warning index matrix of FIG. 15C are transmitted via the motor vehicle communication system (204) to the motor vehicle telematics database and programs (201) and device control unit (102) of FIG. 2 for integration into and use in the artificial intelligence expert system analysis of the present invention.

Figure 15D:
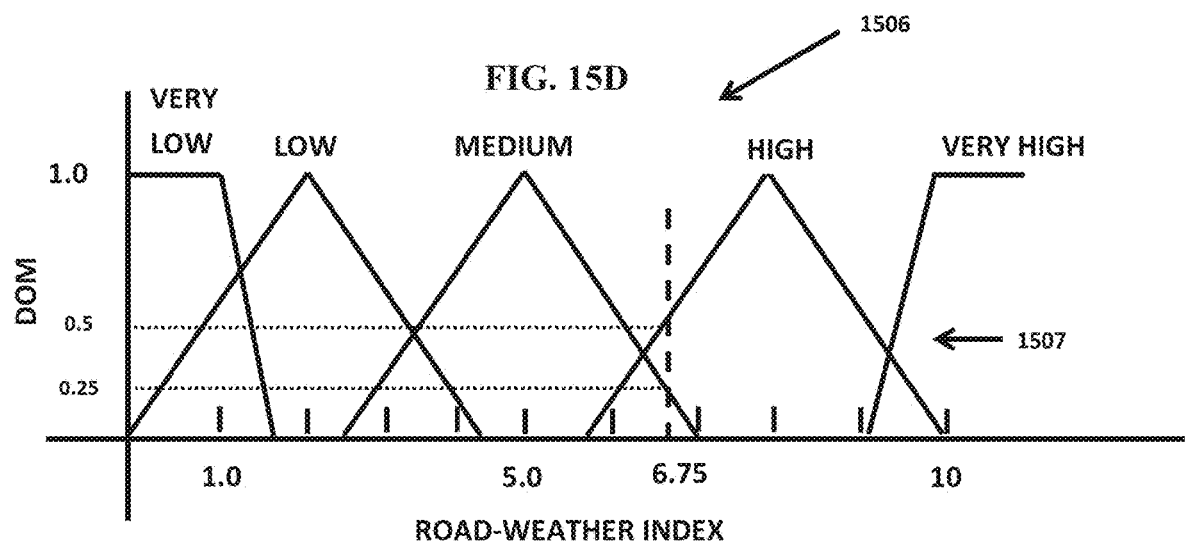
FIG. 15D depicts, without limitation, an exemplary fuzzy logic analysis of the expert systems artificial intelligence road/weather and traffic conditions matrix of FIG. 15C to produce a crisp single road/weather/traffic vehicle driving warning index.
Figure 15D:
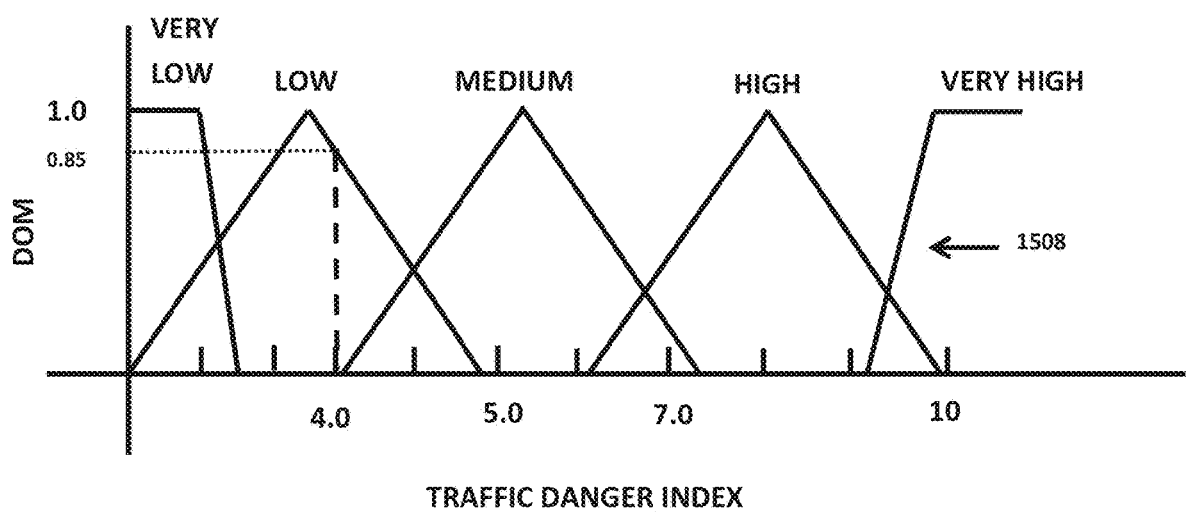
Figure 15D:
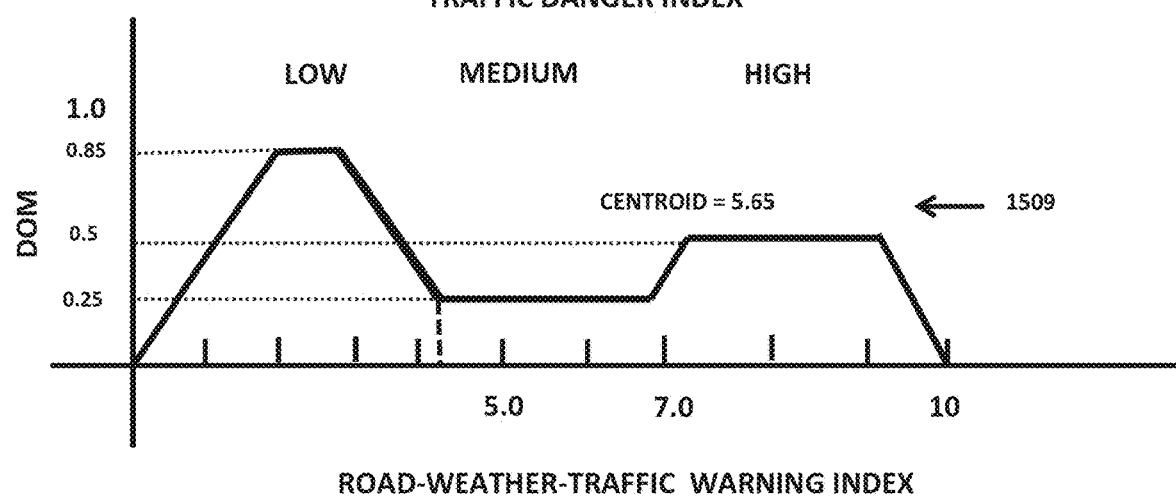

FIG. 15D depicts a fuzzy logic implementation (1506) combining the results of the road-weather index "crisp" value of 6.75 derived in FIG. 15B (1504) with a traffic danger index of 4.0 to compute a "crisp" value for a combined road-weather-traffic warning index. The calculation outlined in FIG. 15D is based on the logical "or" combination of these variables as discussed above. The road-weather "crisp" warning index of 6.75 from FIG. 15B results in firing of both the medium and high DOM functions for that index as illustrated in (1507). The traffic danger index of 4.0 fires only the low DOM function as illustrated in (1508). Using the maximum values and the centroid calculation procedure described above results in a composite road-weather-traffic warning index of 5.65 as shown in FIG. 1509). Note that this value is somewhat less than the road-weather index of 6.75 reflecting the indicated low traffic danger value.

FIG. 15E presents an artificial intelligence expert system decision matrix (1510) for a driver warning index based on the derived road-weather-traffic warning index of FIG. 15D and a derived driver distraction index based upon the above described analysis of FIGS. 11A, 11B and 12. Here again the derived driver distraction index is categorized as corresponding to: (1) very low danger, (2) low danger, (3) medium danger, (4) high danger or (5) very high danger. For example, the degree of danger arising from the driver distraction will depend upon analysis of sensor outputs and derived variables as described above. Once again, considering these various variables a driver distraction expert safety engineer or equivalent personnel may designate danger parameters for the given driver distraction situations into one of the above five categories. As described in the above analysis for FIGS. 11A, 11B and 12 and also in FIGS. 1-10, the driver distraction index will be placed in one of the above five categories based on driver distractions arising from the use of hand-held cellular telephones or other wireless devices, the use of cellular telephones or other wireless devices for texting, and other distractions of the driver arising, for example, from conversations between the driver and other passengers of the motor vehicle or between passengers of the motor vehicle and/or other audio or visual distractions arising in the vehicle. Visual distractions may arise for example from operation of automotive Telematics display units for such purposes as navigation, entertainment control, and display control to learn of motor vehicle conditions, weather conditions, or other information. Modern motor vehicle telematics systems also present distractions for the control of motor vehicle internal environmental such as heat or cooling or fan levels. All of these various parameters may be considered by the above described driver distraction expert safety engineer or equivalent personnel in determining the level of driver distraction as indicated in FIG. 15E.

For example, without limitation, the driver distraction variable may be associated with driver activities as follows:
  driver distraction very low—no driver use of telecommunication device or cellular telephone and quiet conditions in the moving motor vehicle,
  driver distraction low—driver involved in conversations with other passengers or others in the motor vehicle talking on separate telecommunication devices or cellular telephones or involved in distracting conversations
  driver distraction medium—driver talking using hands free connection on telecommunication device or cellular telephone,
  driver distraction high—driver talking on handheld telecommunication device or cellular telephone,
  driver distraction very high—driver texting on telecommunications device or cellular telephone.

Figure 15F:
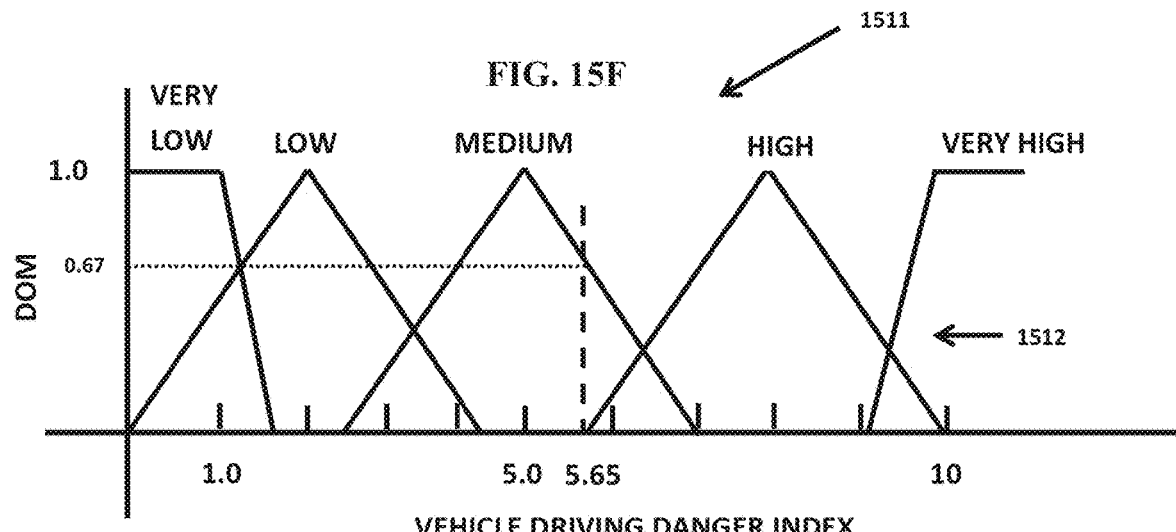
FIG. 15F depicts, without limitation, an exemplary fuzzy logic analysis of the expert systems artificial intelligence of the vehicle driving and driver distraction expert systems matrix of FIG. 15E to produce a crisp single driver warning index based on the combined analysis of roadway, weather, traffic and driver distraction input variables.
Figure 15F:
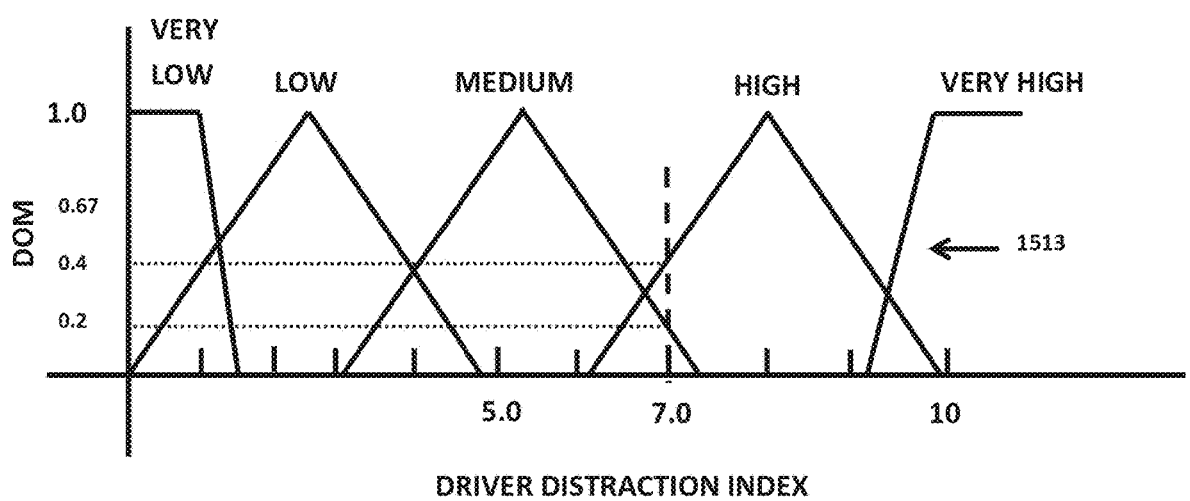
Figure 15F:
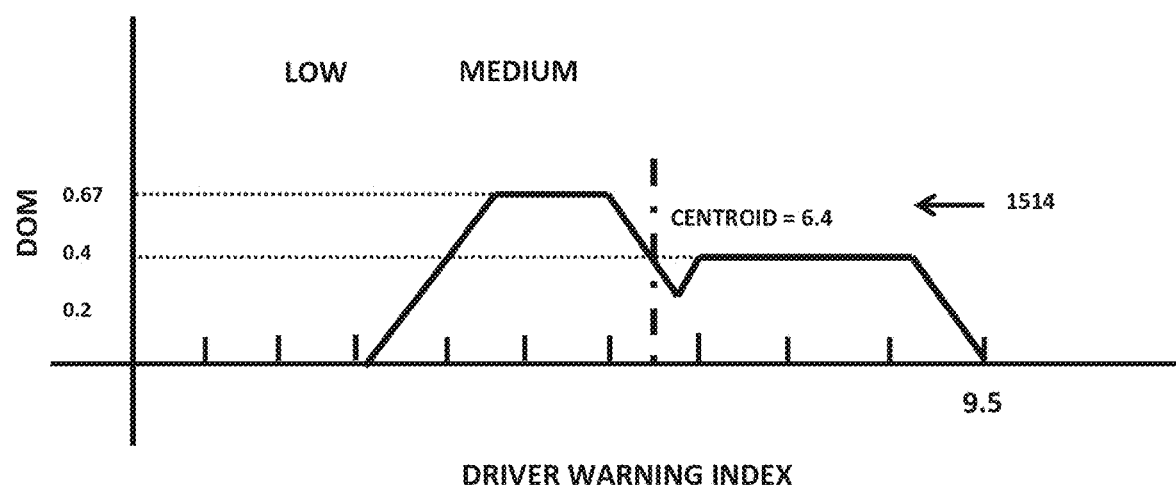

FIG. 15F depicts a fuzzy logic implementation (1511) combining the results of the vehicle driving warning index "crisp" value of 5.65 derived in FIG. 15D (1509) with a driver distraction index of 7.0 to compute a "crisp" value for a composite driver warning index. The calculation outlined in FIG. 15F is again based on the logical "or" combination of these variables as discussed above. The vehicle driving danger index of 5.65 fires only the medium DOM function as shown in FIG. 15F (1512). The driver distraction index of 7.0 results in firing of both the medium and high DOM functions for that index as shown in FIG. 15F (1513). Using the maximum values and the centroid calculation procedure described above results in a composite driver warning index of 6.4 as shown in Fig. FIG. 15F (1514). Note that this value is somewhat less than the driver distraction danger index of 7.0 reflecting the indicated lower vehicle driving danger value of 5.65.

Figure 15G:
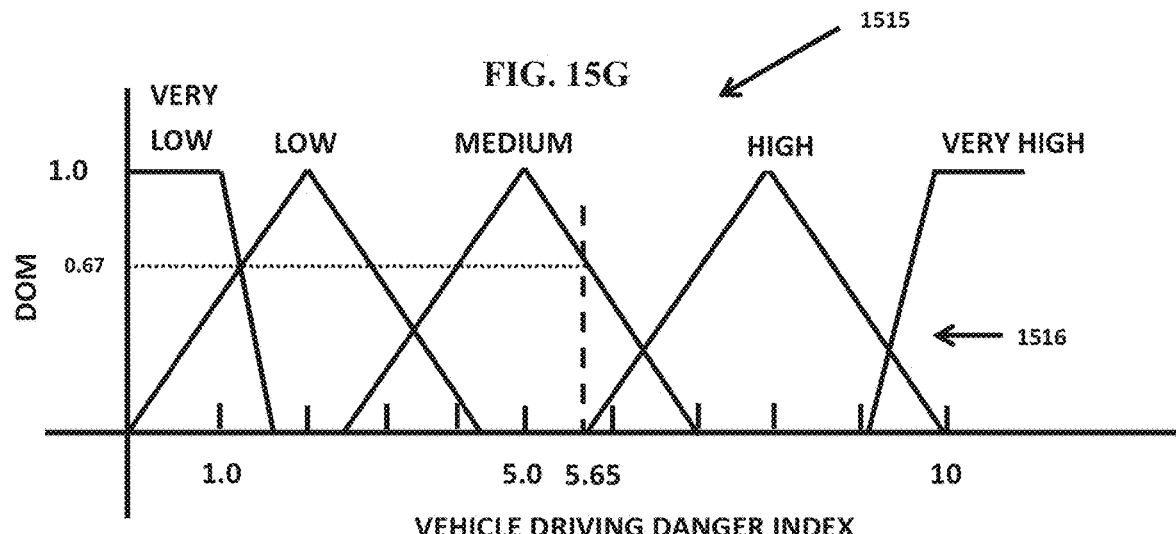
FIG. 15G depicts, without limitation, an alternative exemplary fuzzy logic analysis of the expert systems artificial intelligence of the vehicle driving and driver distraction expert systems matrix of FIG. 15E with a lower driver distraction index than that of FIG. 15F to produce a crisp single driver warning index based on the combined analysis of roadway, weather, traffic and driver distraction input variables.
Figure 15G:
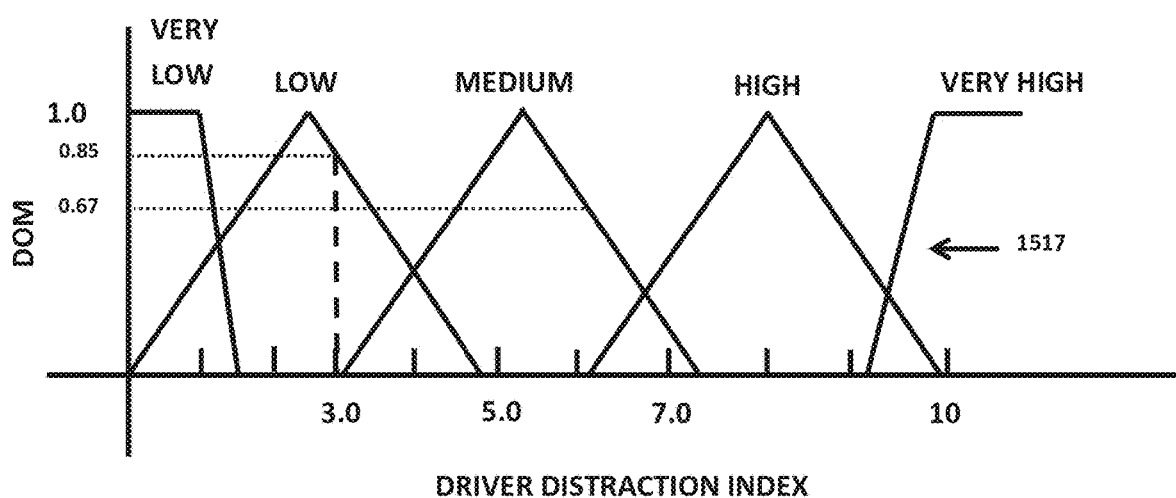
Figure 15G:
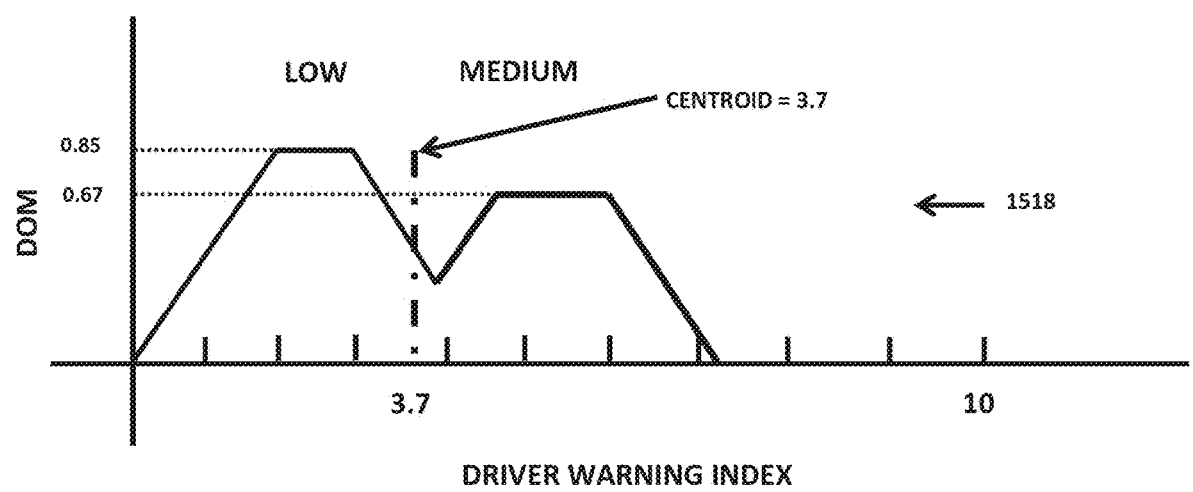

FIG. 15G illustrates the calculation (1515) of FIG. 15F but with the driver distraction index changed from 7.0 to 3.0 as illustrated in (1517). The vehicle driver danger index calculation (1516) is the same as in (1512) of FIG. 15F. As indicated in this case the driver distraction index fires the low DOM but none of the other driver distraction index DOMs. In this case the driver distraction index DOM membership in the low range is equal to 0.85. This lower DOM indicates a considerable decrease in the driver distraction from the value of 7.0 used in FIG. 15F. Using the same calculation procedure as used for FIG. 15F with defuzzification based on the centroid calculation method results in a composite driver warning index of 3.7 as indicated in the diagram (1518) of FIG. 15G. In this case the overall driving warning index of 3.7 is larger than the driver distraction index of 3.0. This reflects the fact that the vehicle driver danger warning index of 5.65 contributes to the overall danger of the driving situation resulting from roadway, weather and traffic considerations. Unlike the calculation of FIG. 15F, in this case the composite driver warning index is greater than the driver distraction index compared to the results of FIG. 15F where the composite driver warning index of 6.4, is less than the driver distraction index of 7.0. Comparison of the results of FIGS. 15G and 15F demonstrate the influence of the roadway, weather and traffic dangers on the overall composite driver warning index of the present invention.

The artificial intelligence expert system warning derivation matrices of FIGS. 15A-15G may also be stored with multiple versions corresponding to, for example, the detection of different drivers based on image analysis facial recognition as described above. In this regard, some drivers may have driving habits that are more dangerous than others in which case the entries in the above described matrices may be changed to indicate a more dangerous situation with particular drivers. For example, young drivers are more likely to have accidents than other drivers. Teenagers are more easily distracted by activities around them including conversations with other passengers, listing to music or lack of concentration on the task of driving. This flexibility to adapt the artificial intelligence expert system analysis methods of this invention may be used to more accurately evaluate particular dangerous situations. The driving habits of particular individuals may also be learned by the systems and methods of the present invention with corresponding updating of the decision variables described above based on such artificial intelligence training or learning.

Figure 15H:
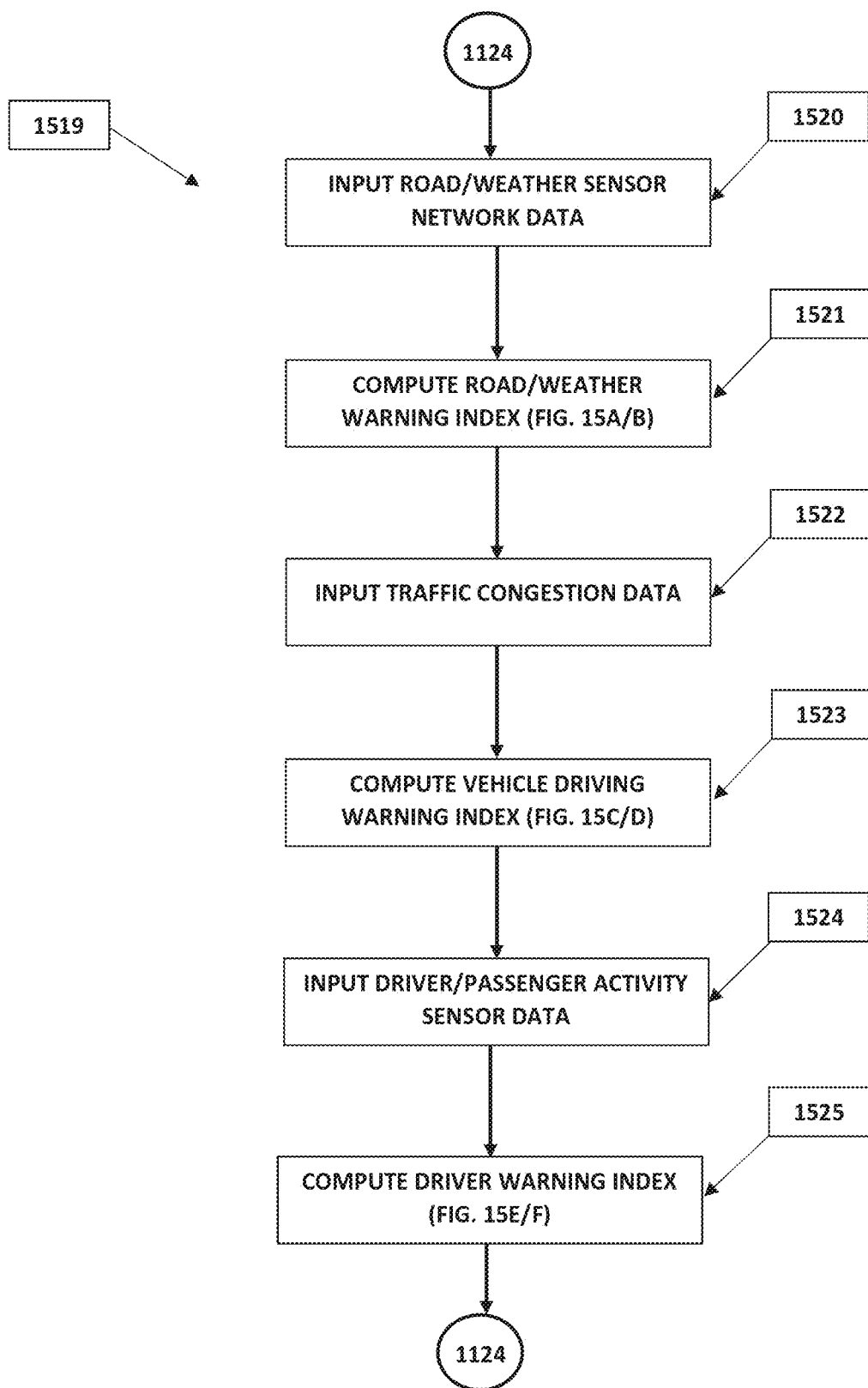
FIG. 15H depicts, without limitation, the partial flow of information in the expert artificial intelligence decision-making set forth in FIGS. 15A-15G.

FIG. 15H illustrates, without limitation, the partial flow of information (1519) in the expert artificial intelligence decision-making set forth in FIGS. 15A-15G and described above. As indicated in the FIG. 15H, artificial intelligence expert system calculations are executed using the device control unit calculations as shown in block (1124) of FIG. 11B. Database information indicating inputs from the road/weather sensor network are analyzed at block (1520). That information is in turn used for calculations of the road/weather warning index of FIG. 15A/B at block (1521) of FIG. 15H. The results of the road/weather warning index calculation is combined with the input traffic sensor network data as indicated in blocks (1522) and (1523) for computing the vehicle driving warning index of FIG. 15C/D in block (1523) as shown in FIG. 15H. As further indicated in FIG. 15H, the computed vehicle driving warning index from block (1523) is combined with input driver/passenger activity sensor data in blocks (1524) and (1525) to compute a final composite driver warning index as indicated in FIGS. 15F and 15G.

While the example of FIGS. 15A-15H is limited to four variables (roadway conditions, weather conditions, traffic conditions and driver distraction) clearly additional tables may be constructed to include other important variables in the decision process as disclosed in this invention.

Figure 16:
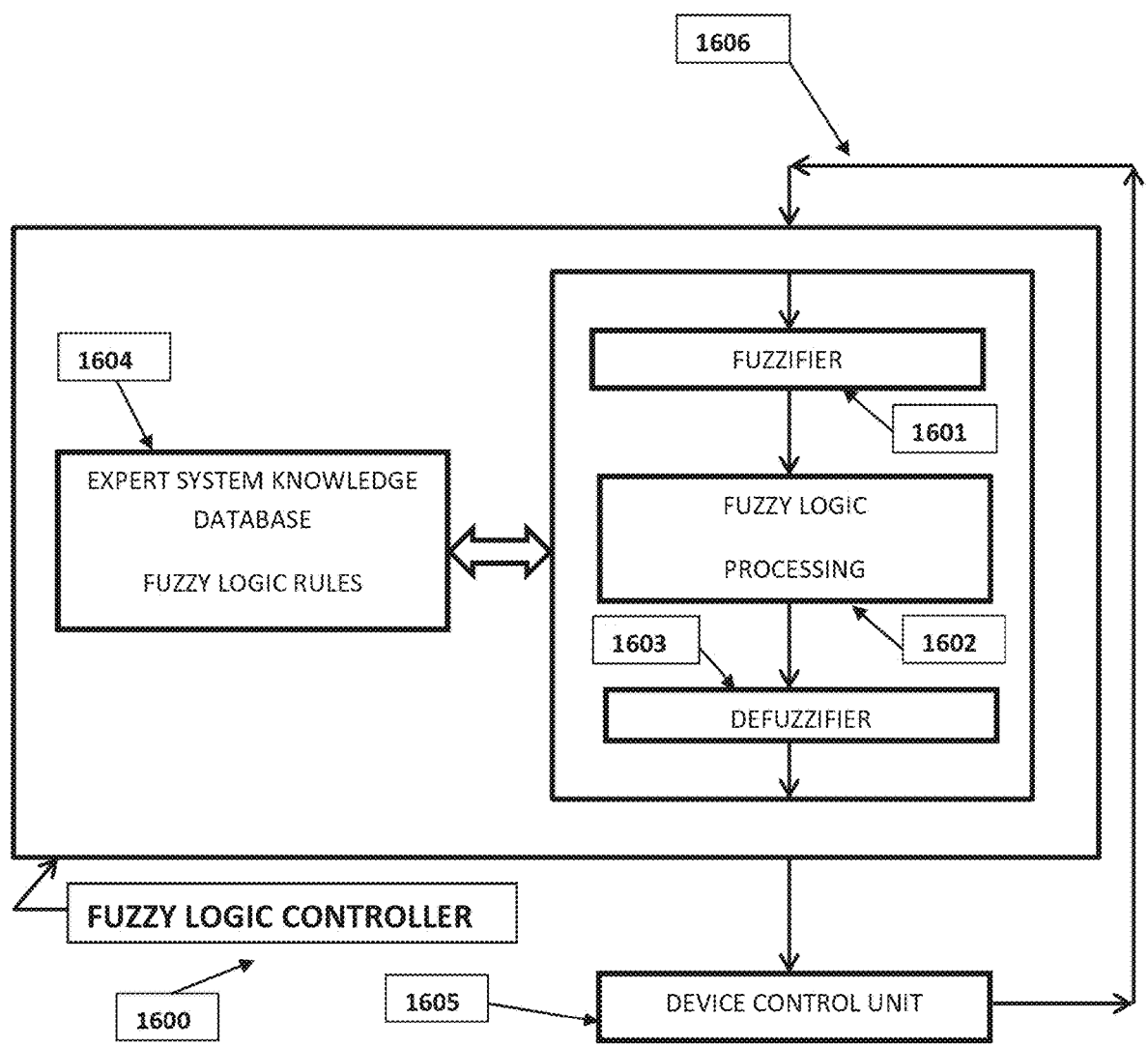
FIG. 16 depicts, without limitation, an exemplary fuzzy logic controller useful in the present invention.

FIG. 16 illustrates in more detail exemplary fuzzy logic operation execution (1600) by the device control unit (300)/(1605) for the system and methods of this invention. As shown in the figure, these operations include access to the artificial intelligence expert system knowledge base (1604) which may include the fuzzy logic rules discussed above. The fuzzy logic operations include the fuzzifier (1601) used to establish degree of memberships (DOMs) as discussed above and illustrated in FIG. 15A-15G. The outputs of fuzzifier (1601) are fed to the fuzzy logic processing element (1602). Defuzzifier (1603) provides crisp numerical outputs for the task dispatch index as illustrated in FIGS. 15A-15G with return control via path (1606).

Figure 17:
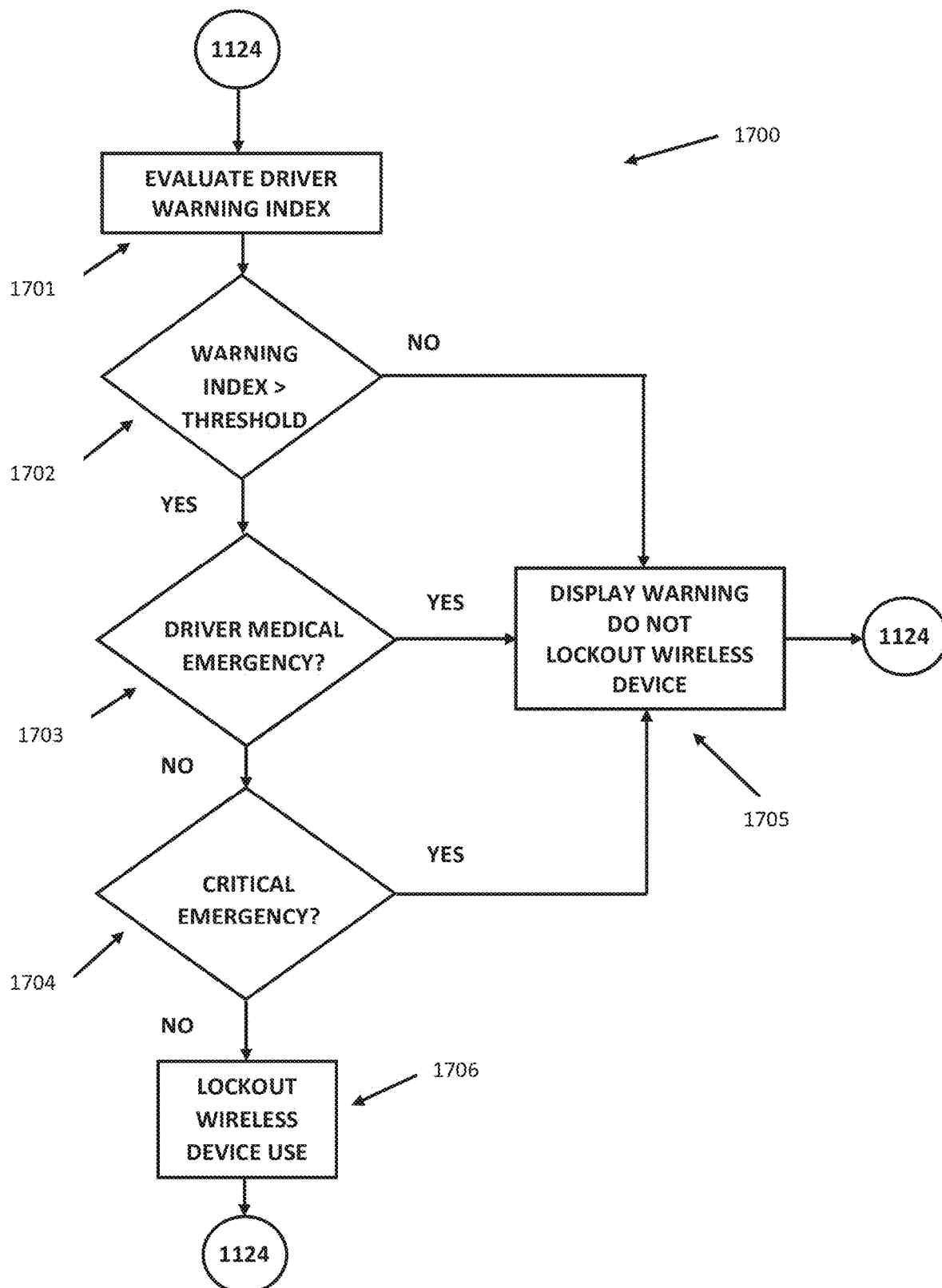
FIG. 17 depicts, without limitation, an exemplary flowchart for lock-out of wireless device control logic considering derived and artificial intelligence expert system driver danger warning index together with emergency driver medical conditions and/or critical driving situations.

FIG. 17 illustrates, without limitation, application of the above derived driver warning index to control a cellular telephone or other wireless device potentially being used in a dangerous manner by the driver of the motor vehicle. The decision process (1700) as indicated in FIG. 17 is carried out by the device control unit operations (1124) as shown in FIG. 11B. The decision process (1700) begins at block (1701) with evaluation of the above computed driver warning index. As indicated in FIG. 15A-15G and discussed above, the output of the fuzzy logic calculation is an analog value in the range from 0 to 10. Using that computed value, control is passed to decision element (1702) to compare that value to an expert defined threshold level to further determine appropriate actions to be taken. If the driver warning index is below this threshold, control is passed to block (1705) to display appropriate warnings without locking out or inhibiting the wireless device from being used by the driver of the vehicle. However, if the driving warning index exceeds the threshold as indicated by decision element (1702), then a decision must be made whether or not to lock out or inhibit use of the cellular telephone or wireless device by the driver of the motor vehicle. In some embodiments, it may be required that the threshold be exceeded for a predetermined period of time before control actions based on exceeding the threshold are employed.

Even if the driver warning index exceeds the expert predefined threshold level, extenuating circumstances may exist where it would be unwise to disable or lockout the cellular telephone or wireless device. For example, it may be the case that a medical emergency exists requiring immediate attention. Such a medical emergency may in fact be detected by the medical sensors (326) of FIG. 3 as discussed above. In such a situation it may be imperative that the driver be able to communicate over the cellular telephone or wireless device regardless of other danger situations that may exist. The driver may need to dial "911" or other emergency contact numbers for advice on how to respond to the medical emergency or to summon immediate assistance. Clearly in such a situation it would be a mistake to inhibit or lockout the cellular telephone or wireless device being used by the driver. As indicated in FIG. 17, if such a medical emergency is detected control is passed again to block (1705) for displaying appropriate warnings without locking out the wireless device.

If no medical emergency is indicated by decision element (1703), control is passed to yet another decision element (1704) for assessment of other critical emergencies that may exist that require the driver be able to communicate via his or her cellular telephone or wireless device in spite of the fact that the driver warning index exceeds the above described threshold. For example, the driver may witness or be involved in an automobile accident, a robbery, road rage, an attack, or other situations that require communication with outside assistance. If such a critical emergency is detected, control is again past to block (1705) to display appropriate warnings without locking out or inhibiting the cellular telephone or wireless communication device.

In one embodiment of this invention, all telephone calls initiated by the driver of the vehicle by dialing "911" will be allowed to proceed regardless of any dangerous driving or driver distraction situations detected by the systems and methods of this invention. In other embodiments, automatic calls for outside assistance by dialing "911" or other emergency response numbers may be made using the systems and methods of this invention. Examples of situations where such automatic calls may be made include, without limitation, deployment of airbags, gunshots detected by the above described microphone arrays and acoustic signal processing, signal outputs from accelerometer (317) of FIG. 3 corresponding to abrupt stops or other abnormal vehicle deceleration indicative of an accident or other situations in which emergency assistance may be required and the driver may not be able to initiate required communications to solicit such assistance.

Finally, if no such critical emergency is detected at decision element (1704), control is passed to the lockout wireless device use block (1706). In this case the driver warning index has exceeded the threshold level and/or no emergency has been detected that would justify continued dangerous use by the driver of the cellular telephone or wireless device. Control is returned again to block (1124) of FIG. 11B as described and discussed above. In this way, the inventive operations and methods of FIG. 17 preclude the inhibiting or lockout of the cellular telephone or wireless device of the driver when emergency situations exist that override potentially dangerous driving conditions that may have been detected.

In some embodiments of this invention, timers may also be used to delay control signals inhibiting the use of cellular telephones or other wireless devices by the driver of the motor vehicle. For example, in some embodiments it may be appropriate to require that the composite driver warning index computation as indicated above to be above a specific threshold for a specified period of time before corrective action is taken. In this way, spurious decisions based on transitory behavior may be reduced or some cases eliminated. For example, if a dangerous situation is indicated by the above described combination of sensors does not persist for a specified period of time, corrective action may be delayed with appropriate warnings being displayed.

Figure 18:
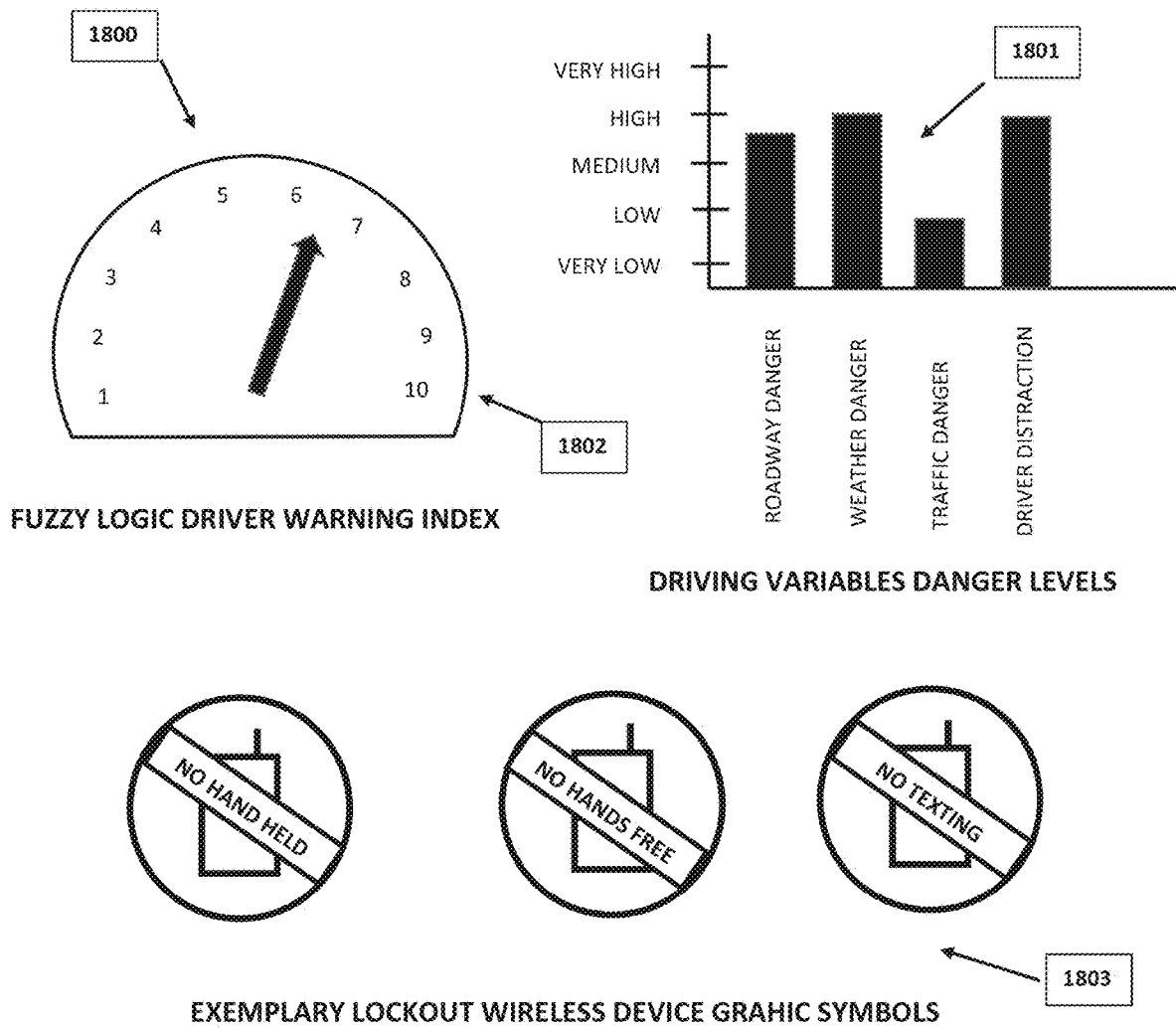
FIG. 18 depicts, without limitation, exemplary warning graphics for possible display to the driver.

FIG. 18 depicts, without limitation, possible display options (1800) indicating selected of the results derived as described above in the present invention. For example, as explained above the calculated driver warning index using the artificial intelligence expert system and fuzzy logic system and methods of this invention results in an analog signal between 0 and 10 indicating a numerical value of the driver warning index. As shown in illustration (1802), the value of the calculated analog driver warning index can be displayed for easy comprehension using a simple analog dial graphic. As also illustrated in FIG. 18, values for the four variables used in the above described calculations may be indicated for easy comprehension using a simple bar-graph as depicted in illustration (1801). The four variables (1) roadway danger, (2) weather danger, (3) traffic danger and (4) driver distraction are all simply displayed as being within the five define ranges of (1) very low, (2) low, (3) medium, (4) high or (5) very high as illustrated in (1801). Such easily comprehended graphics provide information to the driver illustrating the particular concerns giving rise to the computed driver warning index.

Also indicated in FIG. 18 are universally understood graphic symbols (1803) communicating to the driver decisions made in the above described systems and methods resulting in prohibiting the use of handheld cellular telephones or wireless devices, hands-free cellular telephone or wireless devices or any device being used for texting. Here again the particular decision is displayed in an easily comprehended graphic format explaining to the driver the results of the above calculations.

Although the embodiments above have been described in considerable detail, numerous variations and modifications will become apparent to those skilled in the art once the above disclosure is fully appreciated. For example, embodiments with more or fewer variables to be analyzed as described above are possible. Variations of the artificial intelligence expert system analysis may be used. Embodiments for the device control unit as described above, for example, in FIGS. 2 and 3 may be integrated in various degrees with other motor vehicle telematics or system control processors and sensor systems. In some embodiments the device control unit of FIGS. 2 and 3 may include only a subset of the capabilities indicated in FIG. 3. In some embodiments, the device control unit of FIGS. 2 and 3 may include additional capabilities not shown herein. While the above disclosure is based on a standard automobile vehicle environment, the same teachings set forth herein may be applied to other vehicles such as trucks, buses, military vehicles, emergency vehicles such as fire trucks and ambulance and the like. It is intended that the following claims be interpreted to embrace all such variations and modifications.

The invention claimed is:

1. An artificial intelligence (AI) method of warning a vehicle driver of a combination of dangerous vehicle driver activities or situations combined with dangerous vehicle driving conditions comprising: a) a device control unit further comprising a specifically programmed AI computer processing system; b) one or more sensors for monitoring said vehicle driver activities or situations; c) one or more sensors for monitoring said vehicle driving conditions; d) storing in memory for use in said specifically programmed AI computer processing system information from interrelated sensor parameters derived from monitoring said vehicle driver activities or situations and said vehicle driving conditions; e) storing in memory for use in said specifically programmed AI computer processing system expert systems program code for expert system analysis of multidimensional combinations of interrelated vehicle driver activities or situations sensor parameters and vehicle driving condition sensor parameters with expert defined individual parameter ranges for both of said vehicle driver activities or situations sensor parameters and vehicle driving condition sensor parameters with varying degrees of danger for said ranges; f) storing in memory for use in said specifically programmed AI computer processing system expert defined propositional logic inference rules defining multiple range dependent conditional relationships between said vehicle driver activities or situations sensor parameters and vehicle driving condition sensor parameters; g) wherein said conditional relationships result in combined degrees of danger that are more or less than degrees of danger for individual sensor parameters; and, h) warning the vehicle driver by providing expert system derived integrated composite degree of danger warning indices based on propositional logic inference rules for multiple selected vehicle driver activities or situations and vehicle driving condition sensor parameters.

2. The method of claim 1 wherein said device control unit further contains or interconnects and operationally integrates said specifically programmed AI computer processing system, said sensors for monitoring said vehicle driver activities or situations, said sensors for monitoring said vehicle driving conditions, and said memory for storing said AI expert systems program code and said expert defined propositional logic inference rules.

3. The method of claim 2 wherein said device control unit is integrated into and made an operational part of other vehicle control and/or display systems.

4. The method of claim 2 wherein said device control unit further comprises contained or interconnected and operationally integrated near field communications (NFC) capability.

5. The method of claim 2 wherein said device control unit further comprises contained or interconnected and operationally integrated a directional microphone array.

6. The method of claim 2 wherein said device control unit further comprises contained or interconnected and operationally integrated speech/text conversion.

7. The method of claim 2 wherein said device control unit further comprises a contained or interconnected and operationally integrated optical camera.

8. The method of claim 2 wherein said device control unit further comprises a contained or interconnected and operationally integrated an RF directional or omnidirectional antenna and receiver.

9. The method of claim 2 wherein said device control unit further comprises a contained or interconnected and operationally integrated GPS receiver.

10. The method of claim 2 wherein said device control unit further comprises contained or interconnected and operationally integrated a cellular, data, Bluetooth or Wi-Fi communication transceiver.

11. The method of claim 2 wherein said device control unit further comprises contained or interconnected and operationally integrated fuzzy logic processing capability.

12. The method of claim 2 wherein said device control unit further comprises contained or interconnected and operationally integrated cellular phone pairing and hands-free cellular phone operations.

13. The method of claim 2 wherein said device control unit further comprises contained or interconnected and operationally integrated time or clock distribution.

14. The method of claim 2 wherein said device control unit further comprises contained or interconnected and operationally integrated speakers or display systems.

15. The method of claim 2 wherein said device control unit further comprises contained or interconnected and operationally integrated information database access.

16. The method of claim 2 wherein said device control unit further comprises contained or interconnected and operationally integrated medical sensors.

17. The method of claim 2 wherein said device control unit further comprises contained or interconnected and operationally integrated monitoring of said vehicle driver activities or situations comprising monitoring driver attentiveness to vehicle driving with monitoring driver eye or body movement with a camera and image analysis software to verify attention of said driver to driving said vehicle.

18. The method of claim 2 wherein said device control unit further comprises contained or interconnected and operationally integrated monitoring of said vehicle driving conditions further comprising monitoring vehicle traffic congestion or pedestrian traffic congestion, roadway conditions including one or more of construction, roadway obstructions, accidents, law enforcement activities, dangerous curves, narrow roadways, potholes, animal crossings, mountain switch back roads, speed limits, roadway signs, fires, criminal activities, emergency vehicle traffic including fire trucks, ambulances or police or other government vehicles dispatched on an emergency basis to deal with crisis situations.

19. The method of claim 2 wherein monitoring vehicle traffic congestion or pedestrian traffic congestion further comprises, for example, monitoring vehicle and/or pedestrian traffic congestion arising from special events including one or more of concerts, sporting events, and increased pedestrian traffic congestion in specific locations such as school zones, shopping districts, parks, business districts or other areas with increased number of people walking around.

20. The method of claim 2 wherein said device control unit further comprises contained or interconnected and operationally integrated monitoring of said vehicle driving conditions-further comprising monitoring weather conditions including one or more of weather alerts, temperature, rain of varying intensity, lightning, hail of varying intensity, snow of varying intensity, ice and/or snow on the roadway, high winds, tornadoes, hurricanes, blizzards, and other such conditions that present dangerous roadway driving situations.

* * * * *